(12) United States Patent
Ewington et al.

(10) Patent No.: US 9,128,799 B2
(45) Date of Patent: *Sep. 8, 2015

(54) PROGRAMMATIC CREATION OF TASK SEQUENCES FROM MANIFESTS

(75) Inventors: Craig Leslie Ewington, Davidson, NC (US); Daniel McCurdy, Rocklin, CA (US); William Harrison McGraw, IV, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/731,580

(22) Filed: Mar. 25, 2010

(65) Prior Publication Data

US 2011/0113419 A1 May 12, 2011

Related U.S. Application Data

(60) Provisional application No. 61/259,352, filed on Nov. 9, 2009.

(51) Int. Cl.
 *G06F 9/44* (2006.01)
(52) U.S. Cl.
 CPC ....................................... *G06F 8/68* (2013.01)
(58) Field of Classification Search
 CPC ... G06F 9/44505; G06F 11/1433; G06F 8/65; G06F 8/68; G06F 8/61; G06F 8/60
 USPC .......................................... 717/171, 174, 176
 See application file for complete search history.

(56) References Cited

U.S. PATENT DOCUMENTS

| 5,367,686 | A  | 11/1994 | Fisher et al. |
| 6,006,035 | A  | 12/1999 | Nabahi |
| 6,161,218 | A  | 12/2000 | Taylor |
| 6,199,204 | B1 | 3/2001  | Donohue |
| 6,266,811 | B1 | 7/2001  | Nabahi |
| 6,389,433 | B1 | 5/2002  | Bolosky et al. |
| 6,430,738 | B1 | 8/2002  | Gross et al. |
| 6,434,744 | B1 | 8/2002  | Chamberlain et al. |

(Continued)

FOREIGN PATENT DOCUMENTS

EP 1096445 5/2001

OTHER PUBLICATIONS

Ronnau, et al., "Merging Changes in XML Documents Using Reliable Context Fingerprints", Sep. 2008, ACM, pp. 52-61.

(Continued)

*Primary Examiner* — Ryan Coyer
*Assistant Examiner* — Hui-Wen Lin
(74) *Attorney, Agent, or Firm* — Banner & Witcoff, Ltd.; Michael A. Springs

(57) ABSTRACT

Method, apparatuses, and systems are described for receiving, by a computer, data representing a first manifest and a second manifest, the first manifest identifying at least some of a plurality of software components and the second manifest identifying at least some of the plurality of software components; determining a first one of the software components that is identified by the second manifest and not identified by the first manifest; generating, by the computer, a task sequence comprising instructions for installing the first one of the software components to a software stack; and recording, by the computer, data representing the task sequence to a computer-readable medium.

18 Claims, 28 Drawing Sheets

(56) References Cited

U.S. PATENT DOCUMENTS

| | | |
|---|---|---|
| 6,434,745 B1 | 8/2002 | Conley, Jr. et al. |
| 6,453,469 B1 | 9/2002 | Jystad |
| 6,626,357 B1 | 9/2003 | Ross |
| 6,694,336 B1 | 2/2004 | Multer et al. |
| 6,775,829 B1 | 8/2004 | Kroening |
| 6,836,859 B2 | 12/2004 | Berg et al. |
| 6,857,011 B2 | 2/2005 | Reinke |
| 6,928,644 B1 | 8/2005 | Kroening et al. |
| 6,948,165 B1 | 9/2005 | Luu et al. |
| 6,968,321 B1 | 11/2005 | Yu |
| 7,017,144 B2 | 3/2006 | Cohen et al. |
| 7,024,581 B1 | 4/2006 | Wang et al. |
| 7,093,246 B2 | 8/2006 | Brown et al. |
| 7,111,048 B2 | 9/2006 | Hewett et al. |
| 7,127,486 B1 | 10/2006 | Reistad et al. |
| 7,131,123 B2 | 10/2006 | Suorsa et al. |
| 7,150,036 B1 | 12/2006 | Milne et al. |
| 7,171,659 B2 | 1/2007 | Becker et al. |
| 7,181,731 B2 | 2/2007 | Pace et al. |
| 7,181,738 B2 * | 2/2007 | Chan .......................... 717/175 |
| 7,184,759 B2 | 2/2007 | Date et al. |
| 7,251,812 B1 | 7/2007 | Jhanwar et al. |
| 7,330,967 B1 | 2/2008 | Pujare et al. |
| 7,356,679 B1 | 4/2008 | Le et al. |
| 7,411,821 B2 | 8/2008 | Rudelic |
| 7,444,430 B2 | 10/2008 | Minari |
| 7,448,034 B2 | 11/2008 | Anderson et al. |
| 7,461,095 B2 | 12/2008 | Cohen et al. |
| 7,478,381 B2 | 1/2009 | Roberts et al. |
| 7,509,636 B2 | 3/2009 | McGuire et al. |
| 7,536,687 B1 | 5/2009 | Myers |
| 7,537,156 B2 | 5/2009 | Singer-Harter |
| 7,546,594 B2 | 6/2009 | McGuire et al. |
| 7,562,346 B2 | 7/2009 | Jhanwar et al. |
| 7,562,348 B1 | 7/2009 | King |
| 7,574,706 B2 | 8/2009 | Meulemans et al. |
| 7,600,021 B2 | 10/2009 | Schottland et al. |
| 7,613,770 B2 | 11/2009 | Li |
| 7,620,948 B1 | 11/2009 | Rowe et al. |
| 7,668,796 B2 | 2/2010 | Hinchey et al. |
| 7,673,301 B1 | 3/2010 | Righi et al. |
| 7,676,448 B2 | 3/2010 | Henderson et al. |
| 7,694,291 B2 | 4/2010 | Chen et al. |
| 7,711,706 B2 | 5/2010 | Manapetty et al. |
| 7,716,373 B2 | 5/2010 | Hamanaka et al. |
| 7,716,660 B2 | 5/2010 | Mackay |
| 7,716,665 B2 | 5/2010 | Buehler et al. |
| 7,730,480 B2 | 6/2010 | Isaacson |
| 7,739,682 B1 | 6/2010 | Badenell |
| 7,747,848 B1 | 6/2010 | Nallagatla et al. |
| 7,757,228 B1 | 7/2010 | Eatough et al. |
| 7,770,164 B2 | 8/2010 | Schuelein et al. |
| 7,814,476 B2 | 10/2010 | Ho |
| 7,840,957 B2 | 11/2010 | Kumashiro et al. |
| 7,849,462 B2 | 12/2010 | Traut et al. |
| 7,886,292 B2 | 2/2011 | Leung et al. |
| 7,930,371 B2 | 4/2011 | Furuyama et al. |
| 7,975,007 B2 | 7/2011 | Reistad et al. |
| 7,987,459 B2 | 7/2011 | Chow et al. |
| 7,992,134 B2 | 8/2011 | Hinchey et al. |
| 8,037,243 B1 | 10/2011 | Gasser et al. |
| 8,055,096 B2 | 11/2011 | Dahms et al. |
| 8,069,343 B2 | 11/2011 | Concorso |
| 8,091,117 B2 | 1/2012 | Williams et al. |
| 8,112,505 B1 | 2/2012 | Ben-Shaul et al. |
| 8,135,830 B2 | 3/2012 | McClure et al. |
| 8,141,090 B1 | 3/2012 | Graupner et al. |
| 8,156,485 B2 | 4/2012 | Jordan, III et al. |
| 8,176,153 B2 | 5/2012 | Bose |
| 8,176,482 B1 | 5/2012 | Felix |
| 8,201,211 B2 | 6/2012 | Proust et al. |
| 8,209,680 B1 | 6/2012 | Le et al. |
| 8,245,076 B2 | 8/2012 | Schindel, Jr. et al. |
| 8,286,158 B2 | 10/2012 | Hamid et al. |
| 8,316,364 B2 | 11/2012 | Stein |
| 8,453,138 B2 | 5/2013 | Meller et al. |
| 8,495,622 B2 | 7/2013 | Redpath |
| 8,527,868 B2 | 9/2013 | Harter, Jr. |
| 8,549,514 B2 | 10/2013 | Carteri et al. |
| 8,584,113 B2 | 11/2013 | McCurdy et al. |
| 8,639,753 B1 | 1/2014 | Meadows |
| 8,671,402 B2 | 3/2014 | McCurdy et al. |
| 8,677,348 B1 | 3/2014 | Ramanathpura et al. |
| 8,856,723 B2 | 10/2014 | Lam |
| 8,868,717 B2 | 10/2014 | Kushwaha et al. |
| 2002/0002703 A1 | 1/2002 | Baentsch et al. |
| 2002/0016956 A1 | 2/2002 | Fawcett |
| 2002/0047856 A1 | 4/2002 | Baker |
| 2002/0087960 A1 | 7/2002 | Hisatake |
| 2002/0100037 A1 | 7/2002 | Kitagawa |
| 2003/0018763 A1 | 1/2003 | Doherty et al. |
| 2003/0023966 A1 | 1/2003 | Shimizu et al. |
| 2003/0088515 A1 | 5/2003 | Cooper et al. |
| 2003/0093397 A1 | 5/2003 | Yuasa |
| 2003/0182411 A1 | 9/2003 | Wang et al. |
| 2003/0197727 A1 | 10/2003 | Milius |
| 2003/0217005 A1 | 11/2003 | Drummond et al. |
| 2003/0233363 A1 | 12/2003 | Cohen et al. |
| 2004/0015953 A1 | 1/2004 | Vincent |
| 2004/0034849 A1 | 2/2004 | Cohen et al. |
| 2004/0076043 A1 | 4/2004 | Boals et al. |
| 2004/0088694 A1 | 5/2004 | Ho |
| 2004/0093593 A1 | 5/2004 | Jhanwar et al. |
| 2004/0093597 A1 | 5/2004 | Rao et al. |
| 2004/0117414 A1 | 6/2004 | Braun et al. |
| 2004/0117785 A1 | 6/2004 | Kincaid |
| 2004/0127196 A1 | 7/2004 | Dabbish et al. |
| 2004/0145766 A1 | 7/2004 | Sugishita et al. |
| 2004/0148303 A1 | 7/2004 | McKay et al. |
| 2004/0194079 A1 | 9/2004 | Nguyen et al. |
| 2004/0194082 A1 | 9/2004 | Purkeypile et al. |
| 2004/0210362 A1 | 10/2004 | Larson et al. |
| 2004/0268342 A1 | 12/2004 | Hyden et al. |
| 2005/0022178 A1 | 1/2005 | Ghafoor et al. |
| 2005/0027846 A1 | 2/2005 | Wolfe et al. |
| 2005/0044529 A1 | 2/2005 | Simons et al. |
| 2005/0050538 A1 | 3/2005 | Kawamata et al. |
| 2005/0055684 A1 | 3/2005 | Rao et al. |
| 2005/0055688 A1 * | 3/2005 | Barajas et al. ................ 717/174 |
| 2005/0066324 A1 | 3/2005 | Delgado et al. |
| 2005/0071623 A1 | 3/2005 | Goud et al. |
| 2005/0108191 A1 | 5/2005 | Iyengar et al. |
| 2005/0132348 A1 | 6/2005 | Meulemans et al. |
| 2005/0132349 A1 | 6/2005 | Roberts et al. |
| 2005/0132350 A1 | 6/2005 | Markley et al. |
| 2005/0132357 A1 | 6/2005 | Shell et al. |
| 2005/0132359 A1 | 6/2005 | McGuire et al. |
| 2005/0132382 A1 | 6/2005 | McGuire et al. |
| 2005/0149925 A1 | 7/2005 | Pichetti et al. |
| 2005/0177828 A1 | 8/2005 | Graham et al. |
| 2005/0198628 A1 | 9/2005 | Graham et al. |
| 2005/0210459 A1 | 9/2005 | Henderson et al. |
| 2005/0228798 A1 | 10/2005 | Shepard et al. |
| 2005/0240921 A1 | 10/2005 | Barker et al. |
| 2005/0257074 A1 | 11/2005 | Alkove et al. |
| 2005/0262501 A1 | 11/2005 | Marinelli et al. |
| 2005/0283779 A1 | 12/2005 | Pronk van Hoogeveen et al. |
| 2005/0289533 A1 * | 12/2005 | Wang et al. .................... 717/168 |
| 2006/0005016 A1 | 1/2006 | Lee et al. |
| 2006/0010435 A1 | 1/2006 | Jhanwar et al. |
| 2006/0020938 A1 | 1/2006 | Elcock et al. |
| 2006/0026590 A1 | 2/2006 | Berenberg et al. |
| 2006/0048129 A1 | 3/2006 | Napier et al. |
| 2006/0080653 A1 | 4/2006 | Siwatu et al. |
| 2006/0080658 A1 | 4/2006 | Marion et al. |
| 2006/0083173 A1 | 4/2006 | Jordan et al. |
| 2006/0098861 A1 | 5/2006 | See et al. |
| 2006/0112113 A1 | 5/2006 | Gu et al. |
| 2006/0123032 A1 | 6/2006 | Manapetty et al. |
| 2006/0123409 A1 | 6/2006 | Jordan et al. |
| 2006/0123410 A1 | 6/2006 | Kapoor |
| 2006/0123414 A1 | 6/2006 | Fors et al. |
| 2006/0130017 A1 | 6/2006 | Cohen et al. |
| 2006/0130037 A1 | 6/2006 | Mackay |

(56) References Cited

U.S. PATENT DOCUMENTS

| | | |
|---|---|---|
| 2006/0130046 A1 | 6/2006 | O'Neill |
| 2006/0161811 A1 | 7/2006 | Welts |
| 2006/0174238 A1 | 8/2006 | Henseler et al. |
| 2006/0174300 A1 | 8/2006 | Gu et al. |
| 2006/0195816 A1 | 8/2006 | Grandcolas et al. |
| 2006/0265471 A1 | 11/2006 | Pitzel et al. |
| 2006/0265702 A1 | 11/2006 | Isaacson et al. |
| 2007/0006220 A1 | 1/2007 | Han |
| 2007/0015499 A1 | 1/2007 | Vikse et al. |
| 2007/0028229 A1 | 2/2007 | Knatcher |
| 2007/0050762 A1 | 3/2007 | Chen et al. |
| 2007/0079373 A1 | 4/2007 | Gassoway |
| 2007/0101328 A1 | 5/2007 | Baron et al. |
| 2007/0113088 A1 | 5/2007 | Volp |
| 2007/0150595 A1 | 6/2007 | Bhorania et al. |
| 2007/0168348 A1* | 7/2007 | Forsyth ............ 707/10 |
| 2007/0169081 A1 | 7/2007 | Zhao et al. |
| 2007/0169109 A1 | 7/2007 | Neswal |
| 2007/0192532 A1* | 8/2007 | Ogle ............ 711/103 |
| 2007/0192630 A1* | 8/2007 | Crane et al. ............ 713/193 |
| 2007/0192854 A1 | 8/2007 | Kelley et al. |
| 2007/0234334 A1 | 10/2007 | Araujo et al. |
| 2007/0244999 A1 | 10/2007 | Hamanaka et al. |
| 2007/0271552 A1 | 11/2007 | Pulley |
| 2007/0274598 A1* | 11/2007 | Dahms et al. ............ 382/232 |
| 2008/0005733 A1 | 1/2008 | Ramachandran et al. |
| 2008/0028368 A1 | 1/2008 | Depew et al. |
| 2008/0028394 A1 | 1/2008 | Stich et al. |
| 2008/0040714 A1 | 2/2008 | Wheeler et al. |
| 2008/0052704 A1 | 2/2008 | Wysocki |
| 2008/0077944 A1 | 3/2008 | Seely |
| 2008/0109799 A1 | 5/2008 | Imamura |
| 2008/0127175 A1 | 5/2008 | Naranjo et al. |
| 2008/0163194 A1 | 7/2008 | Dias et al. |
| 2008/0196022 A1 | 8/2008 | Diederichs |
| 2008/0209413 A1 | 8/2008 | Kakumani et al. |
| 2008/0244068 A1 | 10/2008 | Iyoda et al. |
| 2008/0244563 A1 | 10/2008 | Sonkin et al. |
| 2008/0247676 A1 | 10/2008 | Minakuchi et al. |
| 2008/0250405 A1 | 10/2008 | Farhangi et al. |
| 2008/0281721 A1 | 11/2008 | Simunovic |
| 2008/0289026 A1* | 11/2008 | Abzarian et al. ............ 726/11 |
| 2008/0307215 A1 | 12/2008 | Willems |
| 2009/0007093 A1* | 1/2009 | Lin ............ 717/174 |
| 2009/0047856 A1 | 2/2009 | Farrell et al. |
| 2009/0063842 A1 | 3/2009 | Azami |
| 2009/0064108 A1 | 3/2009 | De Atley et al. |
| 2009/0070374 A1* | 3/2009 | Eker et al. ............ 707/104.1 |
| 2009/0106753 A1 | 4/2009 | Wang et al. |
| 2009/0118839 A1 | 5/2009 | Accapadi et al. |
| 2009/0119748 A1 | 5/2009 | Yao et al. |
| 2009/0164994 A1 | 6/2009 | Vasilevsky et al. |
| 2009/0204785 A1 | 8/2009 | Yates, Jr. et al. |
| 2009/0249324 A1* | 10/2009 | Brar et al. ............ 717/173 |
| 2009/0257595 A1 | 10/2009 | de Cesare et al. |
| 2009/0265701 A1 | 10/2009 | Naslavsky et al. |
| 2009/0271507 A1 | 10/2009 | Kodimer |
| 2009/0287917 A1 | 11/2009 | Carpenter et al. |
| 2009/0320017 A1 | 12/2009 | Jackson et al. |
| 2010/0017793 A1 | 1/2010 | Grover et al. |
| 2010/0031244 A1 | 2/2010 | Koba |
| 2010/0048296 A1 | 2/2010 | Adiraju |
| 2010/0131942 A1 | 5/2010 | Nannenga et al. |
| 2010/0153941 A1 | 6/2010 | Borissov et al. |
| 2010/0205594 A1 | 8/2010 | Jirka |
| 2010/0214413 A1 | 8/2010 | Lin et al. |
| 2010/0325622 A1* | 12/2010 | Morton ............ 717/168 |
| 2011/0030062 A1 | 2/2011 | Hsu et al. |
| 2011/0066721 A1 | 3/2011 | Shinomiya |
| 2011/0072421 A1 | 3/2011 | Parry et al. |
| 2011/0113421 A1 | 5/2011 | Ewington et al. |
| 2011/0113422 A1 | 5/2011 | Ewington et al. |
| 2011/0113424 A1 | 5/2011 | Ewington et al. |
| 2011/0173457 A1 | 7/2011 | Reh |
| 2011/0225577 A1 | 9/2011 | Wookey |
| 2011/0237227 A1 | 9/2011 | Kemery et al. |
| 2012/0149465 A1 | 6/2012 | Rogan et al. |
| 2014/0040877 A1 | 2/2014 | Goldman et al. |

OTHER PUBLICATIONS

Non-Final Office Action for U.S. Appl. No. 12/731,604, dated Jul. 6, 2012.
Non-Final Office Action for U.S. Appl. No. 12/731,608, dated Aug. 16, 2012.
Non-Final Office Action for U.S. Appl. No. 12/731,611, dated Aug. 1, 2012.
Non-Final Office Action for U.S. Appl. No. 12/731,622, dated Aug. 23, 2012.
Altiris, Patch Management Solution 6.2 for Windows, 2007, pp. 31-55.
OSD, OSD in Configuration Manager, 2007, pp. 20-51.
Christos Gkantsidis, Planet Scale Software Updates, 2006, pp. 423-428.
Final Office Action in U.S. Appl. No. 12/731,604, dated Sep. 13, 2012.
Non-Final Office Action in U.S. Appl. No. 12/731,618, dated Sep. 25, 2012.
Non-Final Office Action in U.S. Appl. No. 12/731,629, dated Oct. 16, 2012.
Non-Final Office Action in U.S. Appl. No. 12/731,592, dated Nov. 19, 2012.
Non-Final Office Action in U.S. Appl. No. 12/731,598, dated Nov. 8, 2012.
Final Office Action in U.S. Appl. No. 12/731,608, dated Oct. 26, 2012.
Final Office Action in U.S. Appl. No. 12/731,611, dated Sep. 20, 2012.
Arnold, "Slaying the Desktop Management Dragon with Configuration Manger 2012"; 2013 ACM; [retrieved on Oct. 17, 2014]; Retrieved from Internet <URL:http://dl.acm.org/citation.cfm?id=2504776>; pp. 31-34.
Jennings, et al., "Specifying Flexible Charging Rules for Composable Services", 2008 IEEE; [retrieved on Oct. 17, 2014]; Retrieved from Internet <URL:http://ieeexplore.ieee.org/stamp/stamp.jsp?tp=&arnumber=4578350>; pp. 376-383.
Standridge, "Modular simulation environments: An object manager based architecture"; 1999 Proceedings for the 1999 Winter Simulation Conference; [retrieved on Oct. 17, 2014]; Retrieved from Internet <URL:http ://ieeexplore.ieee.org/stamp/stamp.jsp?tp=&arnumber=823140>; pp. 598-602.
Dan Frakes, Installing, Upgrading, Backing Up, and Restoring Mac OS X, 2006, pp. 1-5.
Meik Felser, Dynamic Software Update of Resource-Constrained Distributed Embedded Systems, 2007, pp. 1-11.
Yuanyuan Zhou, Delta Execution for Software Reliability, 2007, pp. 1-6.
Paul Willmann, Efficient Hardware/Software Architectures for Highly Concurrent Network Servers, 2007, pp. 35-59.
Aurelien Francillon, Defending Embedded Systems Against Control Flow Attacks, 2009, pp. 19-24.
Richard Eklycke, Implementing Memory Protection in a Minimal OS, 2009, pp. 9-14 and 35-50.

* cited by examiner

PROGRAMMATIC CREATION OF TASK SEQUENCES FROM MANIFESTS

RELATED APPLICATION

This application claims priority from U.S. Provisional Patent Application Ser. No. 61/259,352, filed Nov. 9, 2009, entitled, "Programmatic Creation of Task Sequences from Manifests," the contents of which are hereby incorporated by reference in its entirety.

BACKGROUND

Service providers such as banks and other financial institutions typically provide self-service financial transaction devices (SSFTDs) such as automated teller machines (ATMs) for use by their customers. While the SSFTDs provide a useful service to the customers, there is a significant burden imposed on the service provider to maintain and upgrade the SSFTDs. This burden becomes nearly overwhelming in the case of large institutions, which may have thousands upon thousands of SSFTDs distributed across thousands of miles.

When periodically upgrading the software on the SSFTDs, the service provider may often need to upgrade all of the SSFTDs within a short window of time, so that, for instance, all of the SSFTDs provide a consistent user experience. The SSFTDs are commonly interconnected by a network, however providing upgraded software to all of the SSFTDs over the network may not be practical or economical due to typical network bandwidth limitations.

Even if a software upgrade is eventually provided to the SSFTD, the upgrade usually involves a complex installation sequence, performed locally at the SSFTD, which is prone to error and therefore not reliably repeatable over a large number of machines. Potential errors are even more likely where a human service operator is involved in locally managing the installation sequence at a given SSFTD.

SUMMARY

Aspects as described herein are directed to methods, apparatuses, systems, and software for providing a potentially more effective way to distribute software, and updates thereto, to a plurality of SSFTDs. This may be done in a variety of ways depending upon the significance of the update. For instance, a reference, or master, software stack may be built at a reference machine and imaged, and then the imaged stack is sent to the SSFTDs. The SSFTDs then use the local image to generate a stack on their own local hard drives or other computer-readable media. Where updates are minor (e.g., involving a small number of software components in the stack), then only the updated installation components might be sent. Where the updates are larger, a delta patch file may be sent that may be utilized by the SSFTD in conjunction with the previous version of the locally-stored stack image to produce the updated stack.

To allow for the SSFTD to handle the received image, received delta patch file, and/or installation component updates independently without necessarily requiring a human service operator local to the SSFTD, still further aspects are directed to the SSFTD including a computer-readable medium, such as a hard drive, that includes a logically-protected region, such as a protected folder or partition. The logically-protected region may store the installation components and any instructions (referred to herein as a task sequence) for using the image, the delta patch file, and installation components. A memory-resident (e.g., RAM-resident) operating system may also be stored in the logically-protected region.

The installation instructions may be provided to the SSFTD in the form of one or more various task sequences, depending upon the type of upgrade or installation to be performed. These task sequences may be provided from the reference machine along with the image, the delta patch file, and/or installation components. Still further aspects are directed to automatically and programmatically generating the task sequences by a computer (such as the reference machine) that analyzes a plurality of uniformly-formatted manifests describing the changes to the software stack components and uses the manifests to generate the task sequences.

Still further aspects are directed to at least three types of task sequences that may be sent to an SSFTD: a re-imaging task sequence (for installing a stack from scratch from an image, such as where the hard drive on the SSFTD is brand new); an incremental task sequence (for installing component upgrades to an existing SSFTD software stack; and a cumulative task sequence (for installing a stack from scratch from an image and subsequently installing any component upgrades to that stack). These task sequences may be separate task sequences or they may be combined into a single longer task sequence with various logical entry points into the sequence depending upon whether a re-imaging, incremental, or cumulative process is desired at the SSFTD.

As discussed above, the SSFTD may store these images, delta patch files, the task sequence(s), and a memory-resident operating system in the logically-protected region of the hard drive. Still further aspects are directed to, when installing a new stack from an image at an SSFTD (which may or may not include one or more supplemental delta patch files), erasing the hard drive except for the logically-protected region, and then rebuilding the software on the erased portion of the hard drive using the information and instructions stored in the logically-protected region.

The above upgrades may be propagated to the SSFTDs by way of a network or by way of a local install by a human service operator, such as using a removable computer-readable medium (e.g., a USB stick or disk). In the latter case, it may be problematic if the version of the upgrade on the removable medium is not up to date. For instance, the removable medium may be left over from an upgrade that took place much earlier in time, or it may contain an upgrade copied from a physically proximate other SSFTD that may or may not have the most recent upgrade. Therefore, further aspects are directed to providing version control of new image installs that may be provided from a removable medium.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
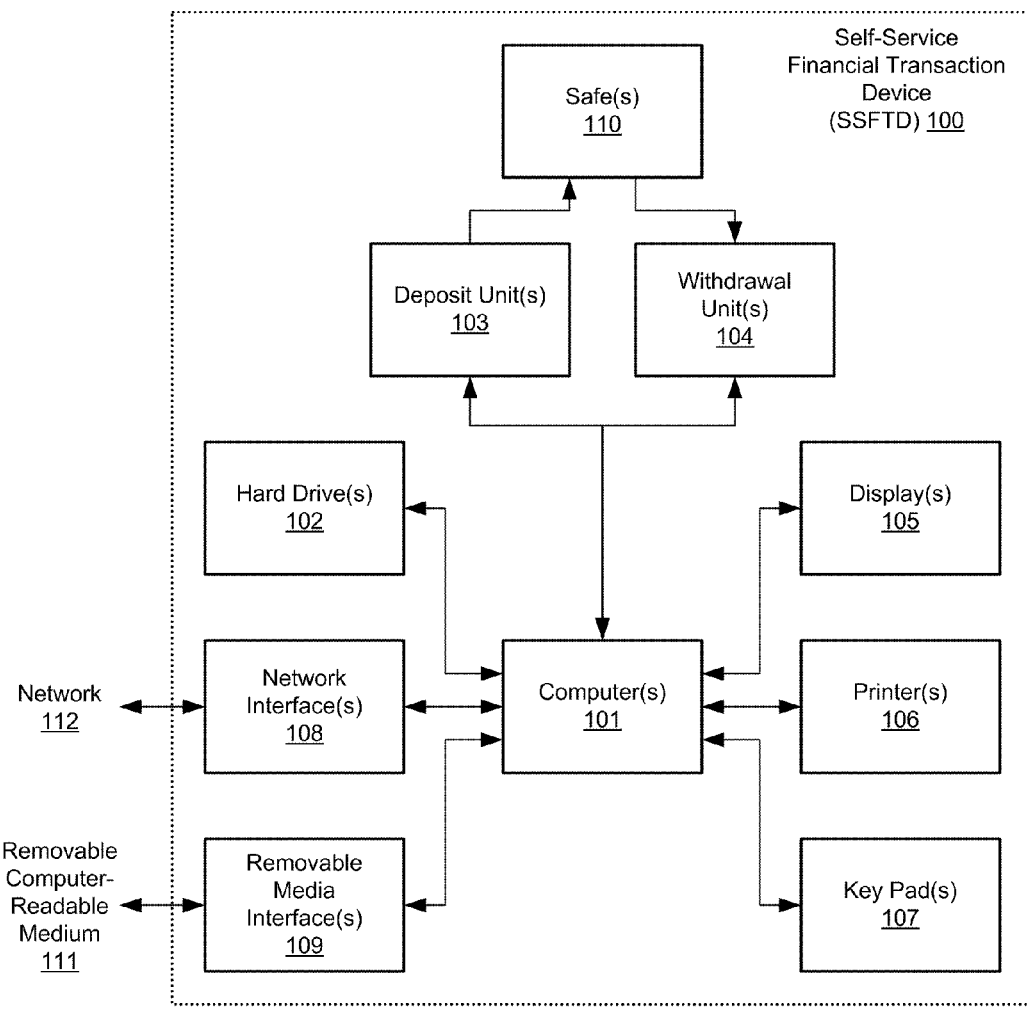
FIG. 1 is an illustrative functional block diagram of a self-service financial transaction device (SSFTD) 100.

FIG. 1 is an illustrative functional block diagram of a self-service monetary device (SSFTD) 100. SSFTD 100 may include, for instance, an automated teller machine (ATM) or automated kiosk for depositing and/or withdrawing monetary amounts. While the withdrawals are typically provided to the user of the SSFTD 100 as currency, the deposits may be in the form of currency or checks.

SSFTD 100 as shown in FIG. 1 includes a computer 101, a hard drive 102 or other computer-readable medium, a deposit unit 103, a withdrawal unit 104, a display 105, a printer 106, a key pad(s) 107, a network interface 108, a removable media interface 109, and a safe 110. Although computer 101 is labeled as a "computer," any one or more of the other functional blocks in FIG. 1 may also be or include a computer. As understood, SSFTD 100 may include one or more computers 101, hard drives 102, deposit units 103, withdrawal units 104, displays 105, printers 106, key pads 107, network interfaces 108, removable media interfaces 109, and safes 110.

The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the functional blocks of FIG. 1 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memory chips, hard drives (e.g., hard drive 102), optical discs (such as CDs or DVDs), magnetic discs, and magnetic tape drives. A computer-readable medium may be considered part of a larger device or it may be itself removable from the device. For example, a commonly-used removable computer-readable medium is a universal serial bus (USB) memory stick that interfaces with a USB port of a device.

A computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 1 and may store computer-executable instructions and/or data used by any of those functional blocks. Alternatively or additionally, such a computer-readable medium storing the data and/or software may be physically separate from, yet accessible by, any of the functional blocks shown in FIG. 1.

Where SSFTD 100 is an ATM, computer 101 is typically embodied as a personal computer. In this example, computer 101 may be responsible for the overall control of SSFTD 100. To perform such control, computer 101 may execute, for example, one or more software applications, one or more device control programs, and one or more operating systems, each of which may be stored on hard drive 102, which may be a single physical hard drive or multiple physical hard drives. These various elements will be discussed in further detail below.

Hard drive 102 may be a single physical hard drive unit or may include multiple physical hard drive units. Rather than, or in addition to, hard drive 102, SSFTD 100 may store data and/or computer-executable instructions on one or more other types of computer-readable medium, such as an optical disc drive, a magnetic tape drive, and/or memory chips.

Deposit unit 103 may be responsible for physically receiving deposited items such as currency and checks, for physically counting the deposited items, for physically holding the deposited items in an escrow area during a deposit transaction, for determining the value of the deposited items, and for physically transferring the deposited items to safe 110 when the transaction is complete. Such deposit units 103 are well-known and often used in many ATMs today.

Withdrawal unit 104 may be responsible for physically retrieving currency or other items from safe 110 during a withdrawal transaction, and for physically providing the retrieved currency to the user. Such withdrawal units 104 are well-known and often used in many ATMs today.

Display 105 may be responsible for displaying a visual user interface to the user, and may also incorporate a touch screen capability for receiving user input. Typical information that may be presented on display 105 includes text and/or graphics representing the status of a transaction. Likewise, printer 106 may be responsible for presenting a paper printout containing information about a transaction. Again, these two elements are often found in conventional ATMs.

Key pad 107 may include one or more buttons, switches, and/or other physical user input elements, and may be responsible for receiving user input associated with a transaction. For example, key pad 107 may include digit keys zero through nine and other function keys.

Network interface 108 may be responsible for data communication between SSFTD 100 and a network 112. The communication may be uni-directional or bi-directional. Network 112 may be a single network or combination of multiple coupled networks, and may be wireless and/or wired. Examples of network 112, or portions thereof, include the Internet, a cellular telephone network, a cellular data network, a wired or wireless local area network, and a satellite communication network.

Removable media interface 109 may be responsible for reading from and/or writing to a removable computer-readable medium 111, such as a USB key, a compact disc (CD), a floppy magnetic disc, or a portable hard drive. Removable media interface 109 may therefore include a physical port for plugging in or otherwise temporarily receiving removable computer-readable medium 111. This port may be physically part of, for instance, the housing of computer 101. However, the port may be located elsewhere in or on SSFTD 100, such as on a rear housing of SSFTD 100 that may be accessible to maintenance servicers of SSFTD 100 but not necessarily to the general public. Regardless of the location of the port, data read from removable computer-readable medium 111 by removable media interface 109 may be provided to computer 101, and data provided by computer 101 may be written by removable media interface 109 to computer-readable medium 111.

Figure 2:
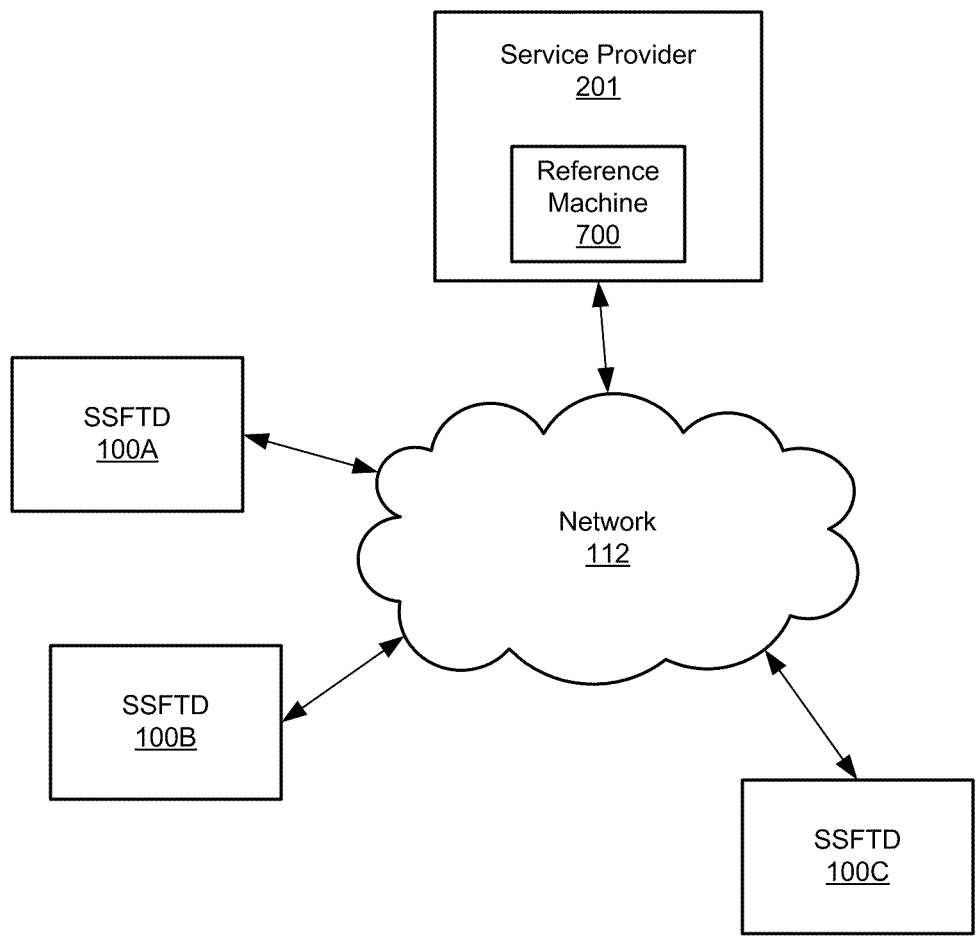
FIG. 2 is an illustrative functional block diagram of a system including a plurality of SSFTDs and a service provider interconnected via a network.

FIG. 2 shows an illustrative system including network 112, a plurality of SSFTDs 100A, 100B, 100C, and a service provider 201 that may include at least one reference machine 700. Service provider 201 may be an entity that is responsible for the software maintenance of SSFTDs 100A-C. Service provider 201 may be, for example a bank or other financial institution, or it may be purely a software maintenance entity.

Reference machine 700 may be located at or otherwise be under the control of service provider 201, and may be embodied as one or more computers. In one example, reference machine comprises a computer including a hard drive for storing a software stack that is built at reference machine 700. The software stack stored at reference machine 201 may be used as a master software stack that is propagated to one or more of SSFTDs 100A-C. As will be described in further detail, this reference software stack, and updates thereto, may be propagated to SSFTDs 100A-C in any of a number of ways. For instance, where the software stack is to be propagated to one of the SSFTDs for the first time or is intended to completely replace any software stack representation at the SSFTDs, then the software stack may be imaged, and the image of the software stack is sent to the SSFTDs rather than the individual components of the software stack. This may reduce the opportunities for errors to occur while installing the software stack at the SSFTDs, because rather than a large number of installation commands for the various components, only a relatively simple set of installation commands may be needed to unpack the image into a software stack at the SSFTDs.

Where the reference software stack undergoes a major change (e.g., version 1.0 to version 2.0), another way that this change may be propagated to the SSFTDs is to send a delta patch file representing only the change. As will be described in further detail, because the SSFTDs may retain a copy of the original software stack image, this propagation may be accomplished by imaging a combination of the software stack prior to the change and the software stack after the change into a single combined image, then imaging only software stack prior to the change, and then determining a delta (difference) between the combined image and the before-change-only image. This delta may be embodied in a file, referred to herein as a delta patch file. At the SSFTD end, this delta patch file may be utilized in combination with the stored pre-change full software stack image at the SSFTD to generate a working new software stack.

On the other hand, where the updates to the software stack are rather minor (e.g., version 1.2 to version 1.21), then the new or added software components (and/or their installers) may be sent to the SSFTDs.

Reference Software Stack

As previously discussed, whether generating an image file on a reference machine or receiving an image at a destination SSFTD, such as an ATM, one or more aspects of the present disclosure are directed to an originating (reference) software stack created at reference machine 700, a representation of that reference stack (e.g., an image) or changes thereto being sent to one or more destination SSFTDs, and creating or updating a software stack locally at the destination SSFTDs based on the sent representation and/or based on a representation already stored earlier at the destination SSFTDs.

Figure 7:
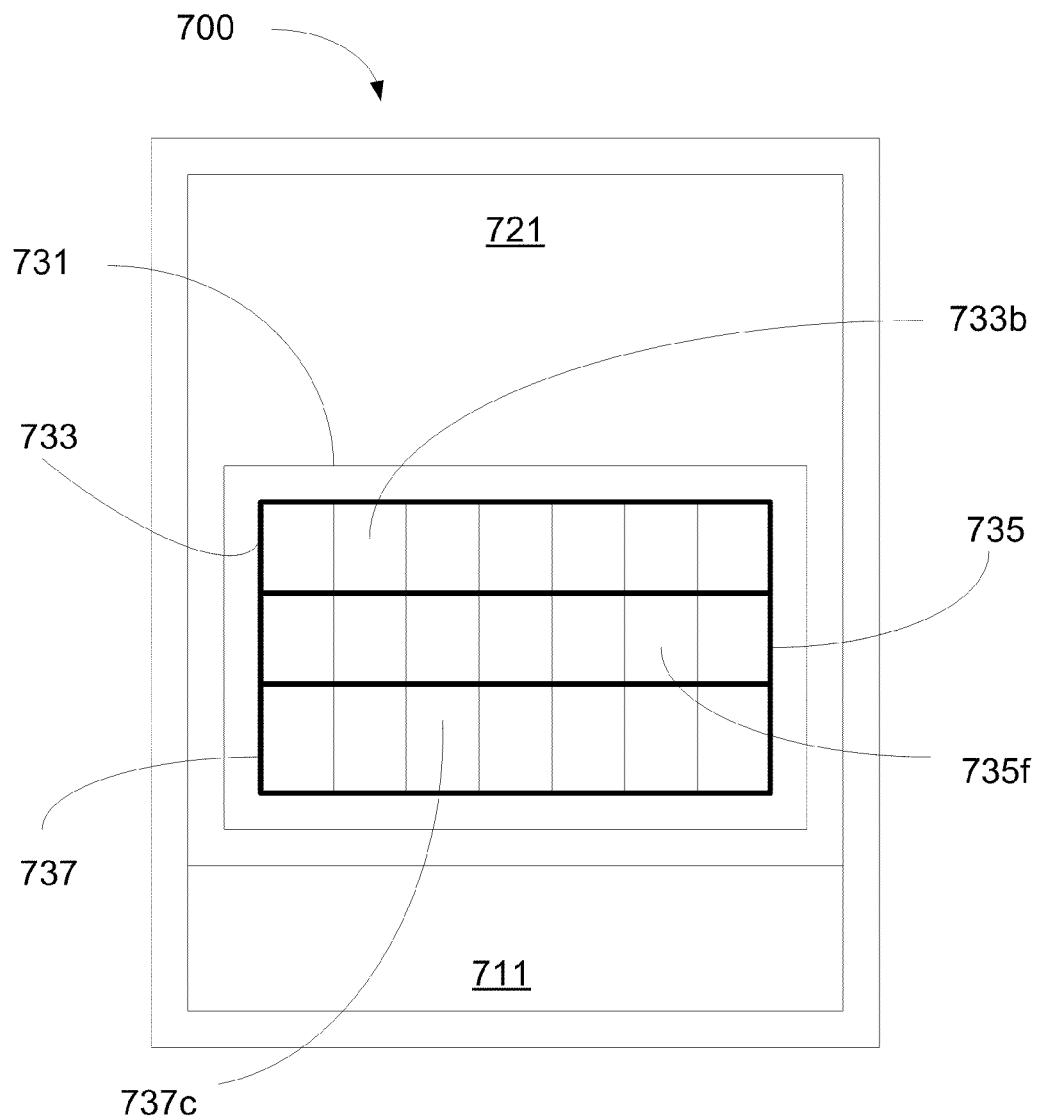
FIG. 7 illustrates an example of a reference software stack associated with a reference machine.

FIG. 7 illustrates an example of a reference software stack 731 associated with reference machine 700. In generating a software stack 731 at reference machine 700, one may begin with a core, which in this example includes a processor, hard drive 721, power supply, and other hardware components 711. An identical or similar core may also reside on each of the SSFTDs 100A-C.

First, the reference machine may boot into a memory-resident (e.g., RAM-resident) operating system. Next, the reference machine 700 may create the reference software stack by being provided with installers for all software components either to be installed or available for installation. These installers may be retrieved from, for instance, a network shared volume. In addition, an instruction sequence may be fetched, such as from the network shared volume. The instruction sequence may be, for instance, an extensible markup language (XML) file that identifies the specified software components to be installed for a software stack on the reference machine, the order of the installation of the various components, and the installation commands themselves. This instruction sequence used to build the reference stack will be referred to herein as the reference stack task sequence.

Reference software stack 731 may be an amalgam of various software installation packages within various logical layers. The specified software components to be installed for reference software stack 731 may generally fall, in this example, within one of three layers: an operating system layer 737, a device management layer 735, and an application layer 733 that may include miscellaneous software applications to support maintenance, software distribution, monitoring and security.

One or more of these layers may originate from one or more different vendors and/or internal development teams of the entity utilizing the software stack. Each layer may be comprised of multiple applications or components, some of which are designated by a lowercase letter (733*b*, 735*f*, 737*c*) in FIG. 7 by way of example.

The root layer may be the operating system layer 737 that the reference machine 700 will boot into at launch and operate in for normal conditions. Various patches, including security patches, may be separate software components, such as 737*b*, for installation purposes. In one example, the first software components for installation on a reference machine 700 may be the operating system and any current patches that have been issued by the manufacturer, these would be 737*a*, 737*b*, 737*c*, and the like.

The next layer for installation in the ordered sequence may be the software components associated with the device control or device management layer 735. A device control layer 735 includes software components that provide the functionality required to control all devices associated with the SSFTD to which the stack will eventually be propagated. The device control layer 735 may be or include, for instance, Extensions for Financial Services (XFS), a programming interface commonly used for controlling associated peripheral devices in an ATM. Where the SSFTDs are ATMs, the associated peripheral devices may be, for example, an access card reading system, the security camera system, the check deposit system, the cash dispenser system, and the like, and/or any of the devices described above in connection with FIG. 1.

Application programming interfaces (API) may be also provided in the device management layer 735. When a vendor has a new device for an associated peripheral device, such as a new access card reader, the vendor provides an API that adheres to a standard for the device control layer ensuring that the new device can slide in to operation without a cumbersome retrofit. As such, for the various devices involved, the device control layer 735 may include one or more software components 735*a*, 735*b*, 735*c*, 735*d*, and the like.

The next layer for installation may be the application layer 733. The application layer 733 may include, for example, software components for execution of business logic and presentation of user interfaces to an end customer, as well as ancillary software, such as third party support and diagnostic software. Software for monitoring the machine may not be an application for an end user within the application layer and, as such, may be resident within an ancillary software layer separate from the application layer 733.

FIG. 7 illustrates various software components of the layers 733, 735, 737. For each respective layer, there may be multiple software installation packages or components. The order of installation of layers as well as the order of installation of specified software packages within a layer may be defined by the reference stack task sequence.

For any particular destination SSFTD, the software stack on that SSFTD may also need to include customization due to the specific hardware the software stack is to be interacting with. For example, the name of the computer in the SSFTD, security identifiers, and driver cache are but three examples of data that may be included in the software stack. However, such information may not be already included in the reference stack at the reference machine, because these examples of data would be different for each SSFTD. As such, it may be desirable to instead generalize the reference stack image to remove such identifiers, to prepare the image for distribution to multiple different machines. The generalized stack then may be migrated to the SSFTDs for loading and subsequent customization.

Software Stack on SSFTD

Figure 8:
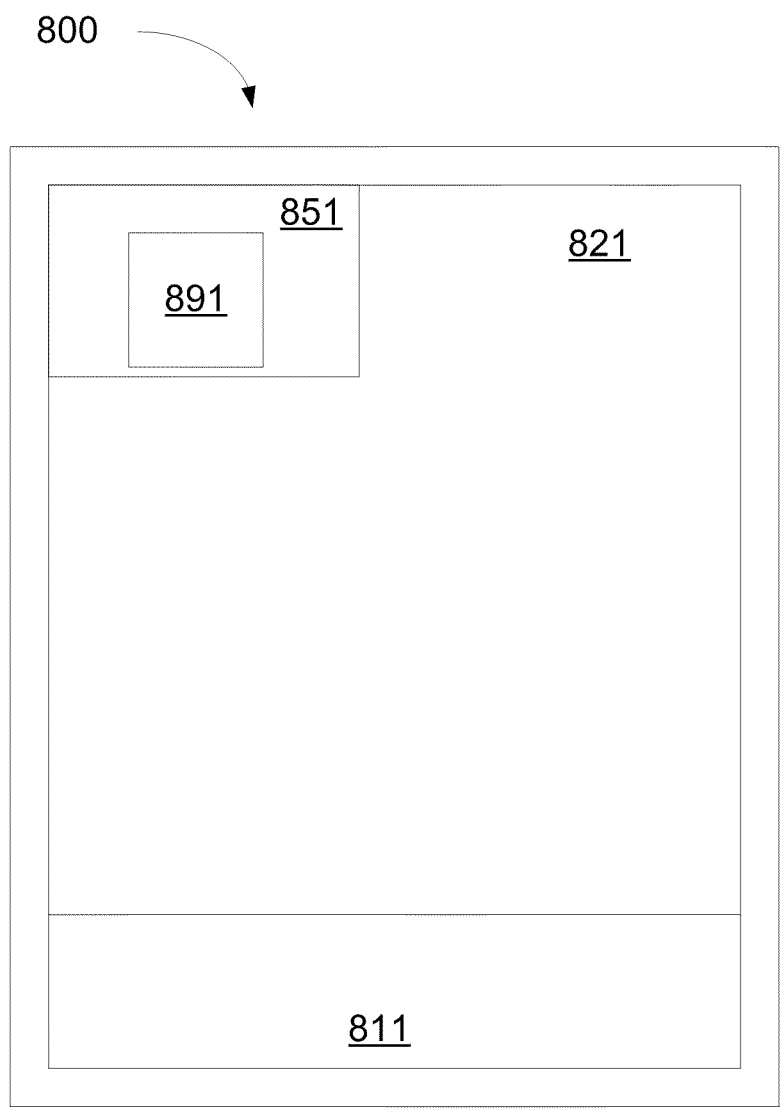
FIG. 8 illustrates an example of a core configuration of a destination machine, such as an SSFTD.

FIG. 8 illustrates an example of a core configuration of a destination machine 800, such as one of the SSFTDs 100A-C. FIG. 8 illustrates a destination machine that has yet to have any type of executable software stack for normal operation. FIG. 8 illustrates a destination machine that lacks a general purpose operating system. Destination machine 800 is shown to include a core, which in this example is a motherboard with hard drive 821, power supply, and other hardware components 811. Since the core does not yet have an operating system to launch into yet, the core may be configured to boot into a RAM resident operating system.

Hard drive 821 of the destination machine 800 also may include a logically protected region 851. This logically protected region 851 may be physically separate from other data storage locations of the reference machine 800 or it may be a defined area of the hard drive 821 that is protected from an operation to clean the remainder of the hard drive 821. Logically protected region 851 of the hard drive 821 provides that when a command to clean the remainder of the hard drive 821 is executed, logically protected region 851 is not erased, modified, or affected. Only the portion of hard drive 821 that is not logically protected would be cleaned. As such, logically protected region 851 may maintain data that will not be inadvertently removed from the hard drive 821. As described herein, logically protected region 851 of destination machine 800 may store an image 891 (or multiple images), installer components, and installation instructions (also referred to herein as a task sequence) as received from reference machine 700 via network 112, as well as the RAM-resident operating system.

Whether received at the destination machine 800 electronically via network 112, or received physically, such as by use of a USB storage device transfer into removable media interface 109, image 891 may represent a generalized software stack migrated to the destination machine from reference machine 700. Image 891 may be, for example, one or more file-based disk image format files, that represent a software stack desired to be loaded onto the destination machine 800, i.e., software stack 731 generated at the reference machine 700. Other imaging technologies may be used. Having received the image 891 now stored in the logically protected area 851 of hard drive 821 on the destination machine 800, an executable software stack may be created onto the non-protected area of the hard drive 821 as described below and as shown in FIG. 9.

Figure 9:
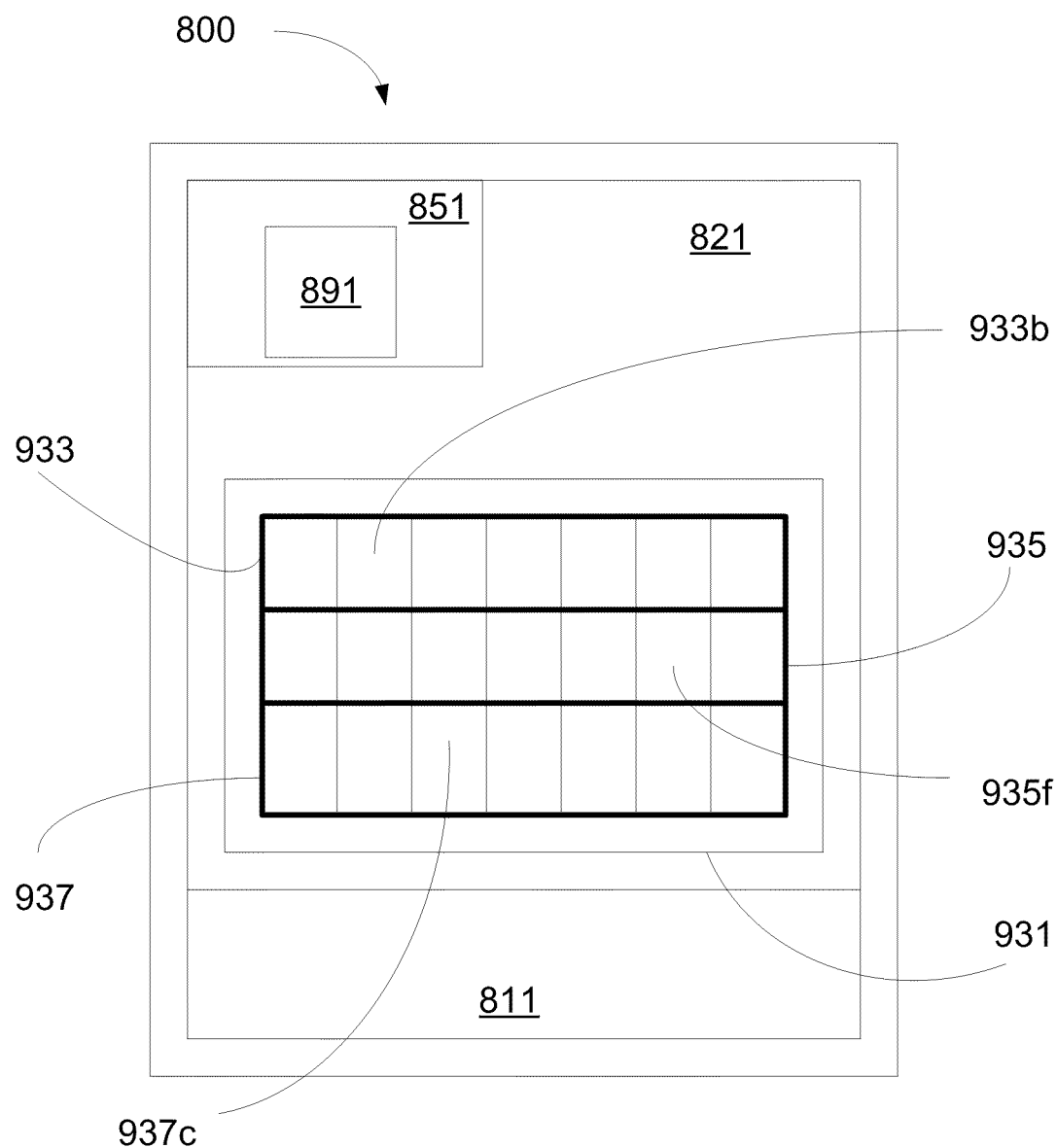
FIG. 9 illustrates an example of a stack configuration in a destination machine.

FIG. 9 illustrates an example of the destination machine 800 from FIG. 8, such as an ATM or other type of SSFTD, with an operational software stack 931 currently in place. The operational software stack 931 may have been built from the image file 891 maintained in the logically protected region 851 of the hard drive 821.

The software image 891 in the logically protected region 851 then may have been applied to the hard drive 821 by copying the software stack to the hard drive 821. Associated peripheral devices of the destination machine 800 then may have been operationally connected to the operating system within the software stack 931. Finally, the destination machine 800 may have been configured/personalized for the machine in question, such as serial numbers and other data for devices and components included. Destination machine 800 in FIG. 9 is shown to include the core with hard drive 821, and other hardware components 811.

Because software stack 931 was created from the image 891 (which in turn was created from the reference stack generated at the reference machine 700), the software stack 931 on the destination machine 800 is expected to be the same software stack as the reference stack (except for any subsequent customization).

Software stack 931 includes an operating system layer 937, identical to operating system layer 737, that the destination machine 800 will boot into at launch and operate in for normal conditions. Various patches, including security patches, may be separately installed as software components, such as software component 937c.

The stack 931 also includes a device management layer 935 identical to device management layer 735. Device control layer 935 includes software components that provide the functionality required to control all devices associated with the destination machine 800. In the example of an ATM, the associated peripheral devices may be an access card reading system, a security camera system, a check deposit system, a cash dispenser system, and the like.

The stack 931 also includes an application layer 933 identical to application layer 733. The application layer 933 is designed to include software components for execution of business logic and presentation of user interfaces to an end customer utilizing the destination machine 800.

The software stack 931 having been installed, and upon customization of the stack 931, the destination machine 800 now may operate in normal conditions.

Changes to the Software Stack on the SSFTD

At times, it may be desirous to change the software stack of a destination machine 800. Any of a number of reasons may exist for such a change. For example, a vendor may have a new security patch related to a piece of software that is operating on the destination machine 800. When one or more of these particular software package changes are desired, the service provider 201 may want to change the software stack of the various destination machines under its control.

Where the change is very large, service provider 201 may generate a new reference stack at reference machine 700 in the same manner as previously described, and then have that software stack propagated via network 112 to a destination SSFTD (e.g., SSFTDs 100A-C), such as via a delta patch file sent to the logically protected region of the hard drive of the destination SSFTD.

Figure 10:
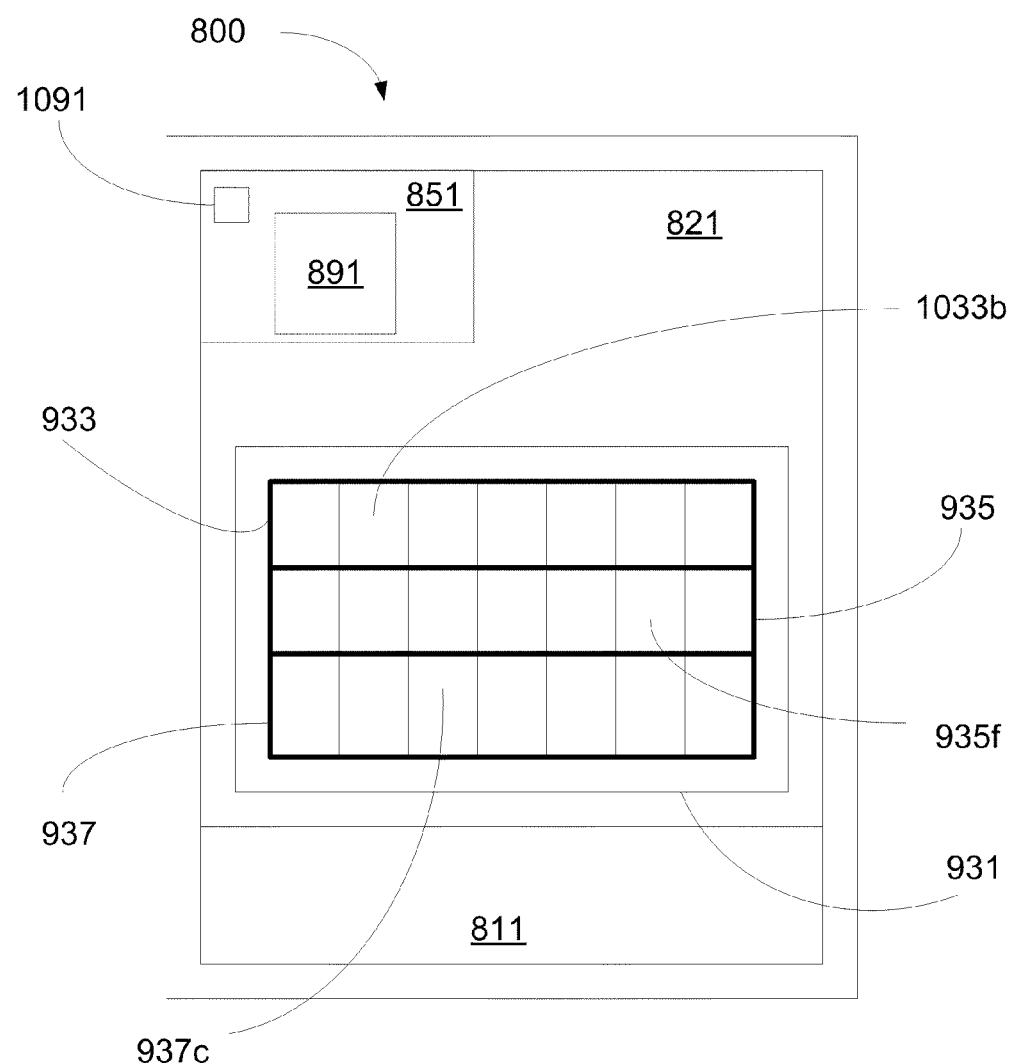
FIG. 10 illustrates an example where an incremental change to the software stack of a destination machine is performed.

However, undertaking such a large transfer may not always be desirous, especially where the stack must be transferred to a large number of destination SSFTDs, and/or where the changes are smaller, such as only a few software components in the stack being updated. In such a case, it may be desirable to implement an incremental update. FIG. 10 illustrates an example where an incremental update to the software stack 931 of the destination machine 800 is performed.

In this example, a software installation package, as well as an installation task sequence 1091 describing how to install the software installation package, has been received by the destination machine 800 from the reference machine 700 via network 112, and stored in the logically protected region 851 of the hard drive 821. The software package 1091 may be, for example, a new version of a software package already being utilized within the software stack 931 of the destination machine 800, or a brand new component not previously existing in the stack. The new version may be a security patch or other software component. The installation task sequence, also referred to herein as the incremental task sequence, may be a set of instructions for how to install the new software package.

In the example shown in FIG. 10, the incremental task sequence, captured as an Extensible Markup Language (XML) file, and the software package of one or more installers. The installers may include multiple software updates for changes to the software stack 931. In this particular example, only a single change or single software package will be described, for simplicity. The XML file of the incremental task sequence and the one or more installers may be wrapped together inside a single package 1091.

In the example of FIG. 10, to change the software stack 931 so as to include the desired new package 1091, a process for updating the software stack may be performed, as dictated by the incremental task sequence 1091. For this example, package 1091 will be considered to be a new version of a software package associated with the security camera system of the destination machine. To process the change to the software stack 931 in accordance with the incremental task sequence 1091, the destination machine 800 first may be taken out of operation. Such a step may not be a physical move of the destination machine; rather, such a step may be a time where a customer of the destination machine cannot operate the destination machine for some type of self-service financial transaction.

Figure 3:
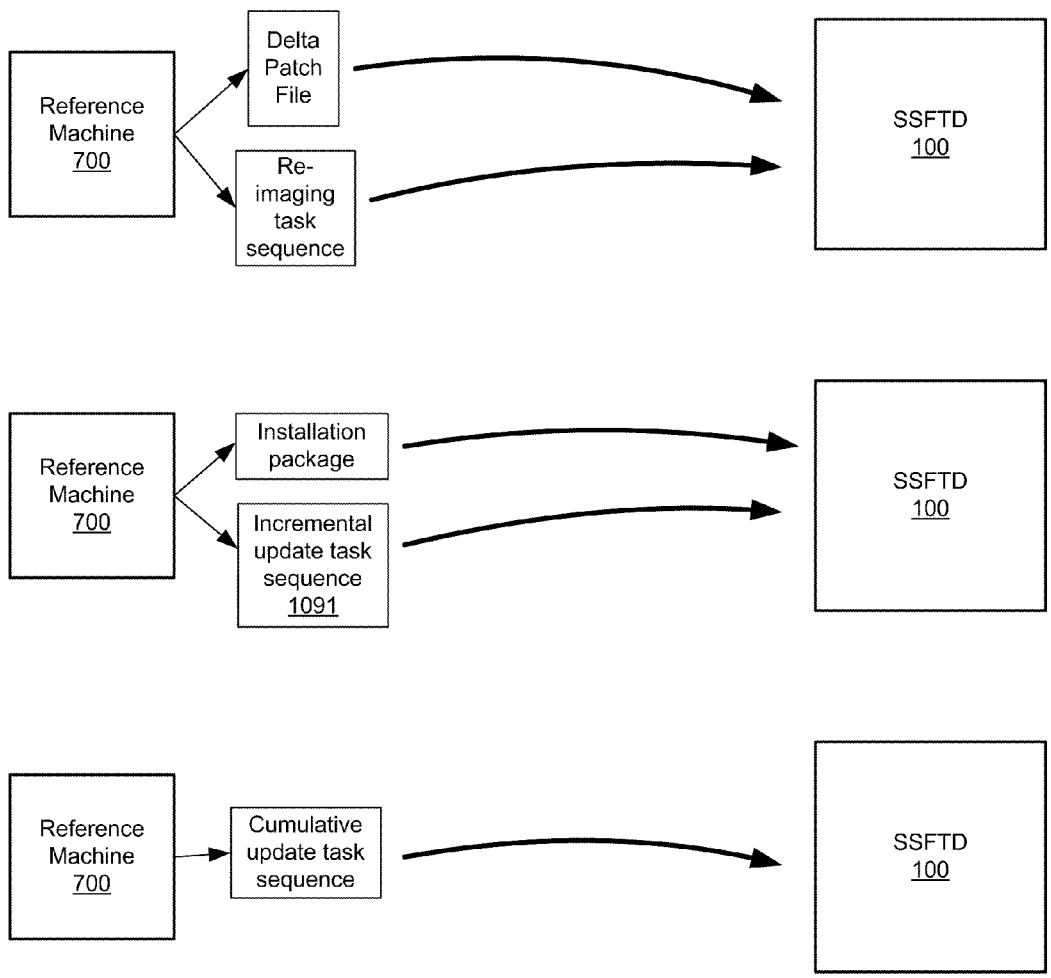
FIG. 3 is an illustrative functional block diagram showing three ways for a reference stack and/or updates thereto to be propagated to a destination SSFTD.

With the destination machine taken out of operation, the incremental task sequence 1091 may specify which software component currently in the software stack 931 to de-install (i.e., the component that is to be replaced). In the example of FIGS. 9 and 10, software component 933b may have been de-installed. Referring momentarily to FIG. 3, the middle row shows an example of incremental updating, in which reference machine 700 propagates both the incremental task sequence 1091 and the installation software package to the destination SSFTD via network 112.

Next, the task sequence specifies to re-install the software component using the installation component utilizing the installation software package stored in the logically protected region 851. This result of this incremental update is shown in FIG. 10 as software component 933b having been replaced with software component 1033b. In this example, software component 1033b is the new version of the camera security software that was received in the installer file.

To complete the process, the destination machine 800 is brought back into operation. Now, when a customer utilizes the destination machine, the stack containing the new software package 1033b is being executed.

The incremental change to the software stack 931 operation described with respect to FIG. 10 illustrates a situation where re-imaging, i.e., utilizing the stored image file 891 in the logically protected region 851, was not needed in order to update the software stack 931 and operation of the destination machine 800. However, there may be situations where an incremental update is desired in conjunction with re-installing the software stack from the image stored in the logically-protected region. For instance, the executable version of the stack may be acting unreliably, and so it may be desired to rebuild the entire stack, and then incrementally update that rebuilt stack, from ground up. Such an updating process is referred to herein as a cumulative update process.

Figure 11:
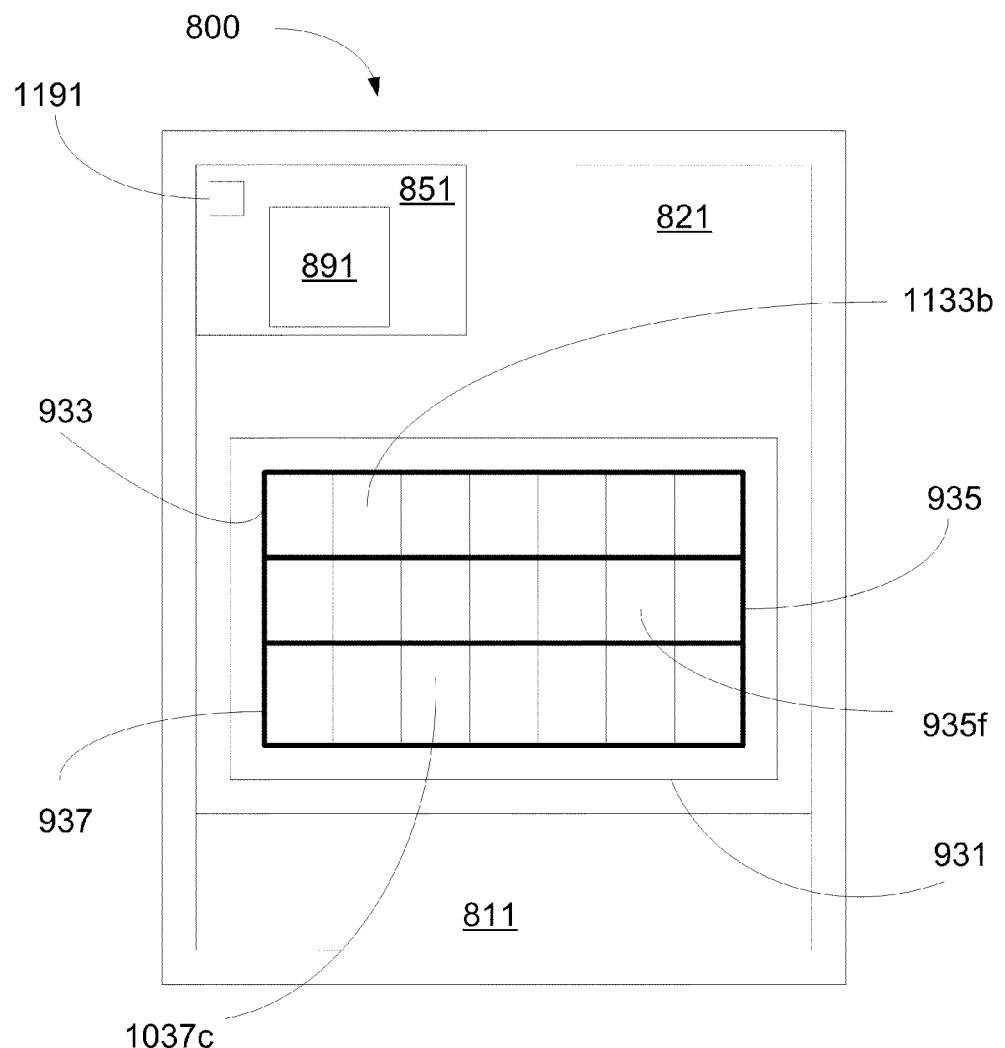
FIG. 11 illustrates an example where a cumulative change to the software stack of a destination machine is performed.

FIG. 11 shows a cumulative update to apply to the software stack 931. As mentioned above, a cumulative update accounts for the desire to re-image the software stack from the image file 891 maintained in the logically protected region 851 of the hard drive 821. In this example, one or more software packages and a task sequence 1191 with instructions for performing the cumulative update (also referred to herein as a cumulative update task sequence) has already been received by the destination machine 800 and stored in the logically protected region 851 of the hard drive 821. Thus, as shown by way of example in FIG. 3 on the bottom row, only the cumulative update task sequence may need to be sent from reference machine 700 to the destination SSFTD, via network 112.

The package 1191 may include a new version of a software package already being utilized within the software stack 931 of the destination machine 800. The new version may be associated with the operating system or some other software component. The task sequence may be a set of instructions for how to install the new software package. In the example shown in FIG. 11, the cumulative update task sequence, captured as an Extensible Markup Language (XML) file, and the software package of one or more installers. The installers may include multiple software updates for changes to the software stack 931. In this particular example, only a single change or single software package will be described, for simplicity. The XML file of the cumulative update task sequence and the one or more installers may be wrapped together inside a single package 1191.

In the example of FIG. 11, to update the software stack 931 so as to include the desired new software package 1191, a process for updating the software stack may be performed in accordance with the cumulative update task sequence that includes re-imaging of the software stack and installation of any incremental updates. Thus, a cumulative update may include performing (1) installation or replacement of the executable stack from the stack image stored in the logically protected region, and (2) performing an incremental update on the re-installed stack. Thus, the cumulative update task sequence may look very similar to the incremental update task sequence, except that one or more additional instructions for erasing the hard drive (except for the logically protected region) and re-installing the software stack from the image, may be included in the cumulative update task.

To process the update to the software stack 931, the destination machine 800 first may be taken out of operation. With the destination machine taken out of operation, the cumulative update task sequence 1191 may be accessed to determine the manner for installation. As part of the instructions of the cumulative update task sequence 1191, the hard drive 821 may be entirely cleaned except for the logically protected region 851. The software image 891 in the logically protected region 851 then may be used to install the software stack to the non-logically-protected region of the hard drive 821. This re-installation of the stack from the pre-stored image is referred to herein as re-imaging.

As described in more detail herein, the re-imaging of the software stack 931 from the image 891 may involve reverting back to a different version of the software stack than was previously in place. This is because there may also be incremental updates that are needed. In reverting back to a previous version of the software stack, the previous version never may be seen by a customer because the destination machine may not be brought into service until such time as all the incremental updates have been applied. To accomplish the incremental updates, the same incremental update process as describe above may be performed.

For instance, the cumulative update task sequence 1191 may specify a software component currently in the software stack 931 to de-install. In the example of FIG. 11, software component 933b is shown to have been de-installed. Next, the cumulative update task sequence specifies to re-install the software component utilizing the software package 1191 stored in the logically protected region 851 that was previously received by the destination machine. This change is shown in FIG. 11 as software component 1133b. Software component 1133b may be a new version of a software component that was received in the software package 1191.

To complete the process, the destination machine 800 is brought back into operation. Now, when a customer utilizes the destination machine, the software stack including the new software package 1133b is being executed.

In some cases, larger changes may be desired to the software stack. In these cases, incremental or cumulative updates may involve a relatively large number of installation steps. As previously discussed, the more software installation steps involved, the more chances there are for error. Thus, it may be desirable to send an image representing the updated software stack. However, as also discussed above, such an image may utilize an unacceptable amount of network bandwidth, especially where the image is propagated to a large number of destination SSFTDs. Thus, as an alternative to sending an image representing the entire new software stack, there is now described a way to send sufficient information to build a new software stack while still potentially sending less information over network 112, i.e., utilizing less network bandwidth. In particular, a file representing changes, or the delta, to a software stack, may be sent and used as a patch. Such a file used for delta patching is referred to herein as a delta patch file.

Figure 12:
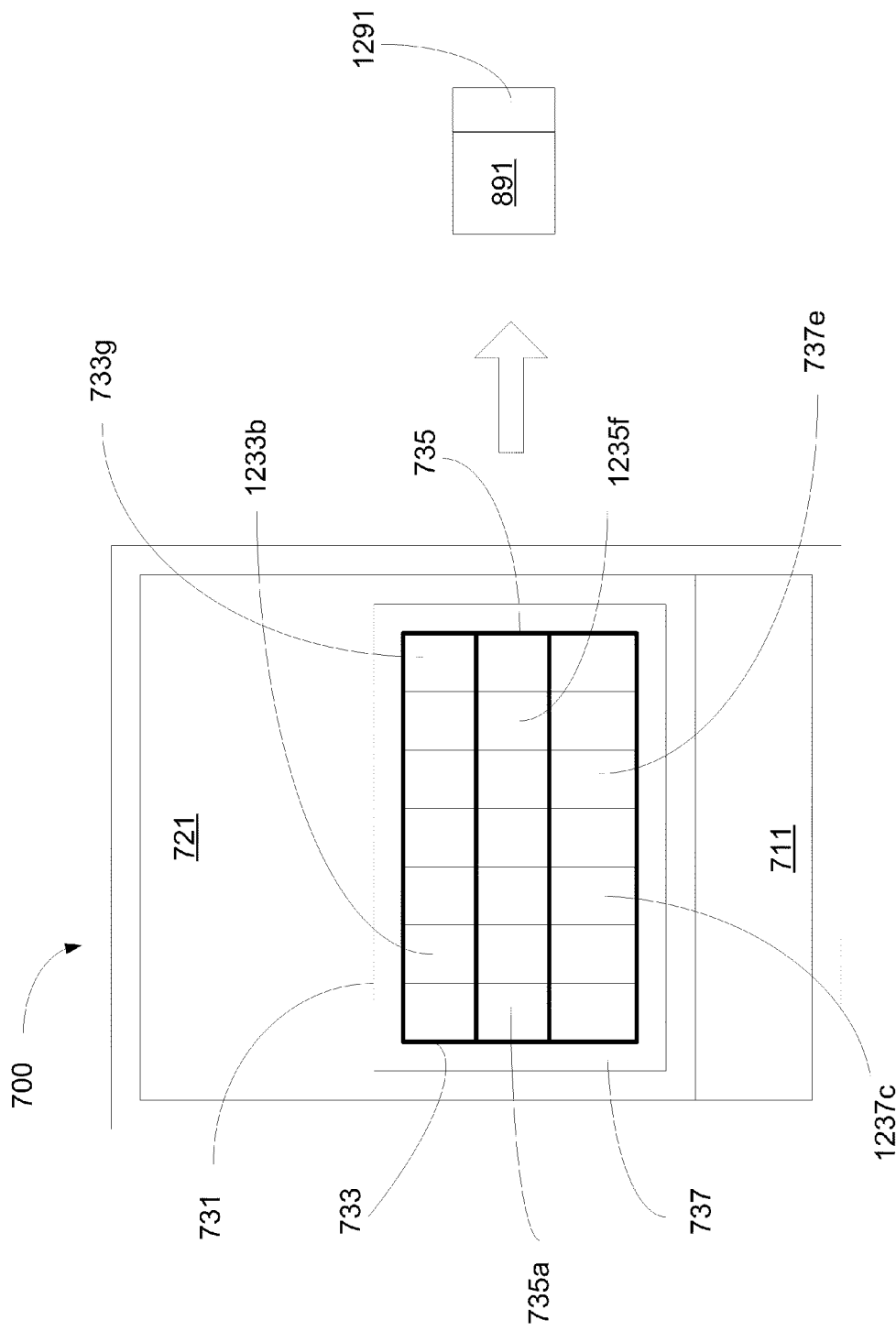
FIG. 12 illustrates an example of the changes that may be made at a reference machine that are representative of the desired changes to be made at a destination machine.

FIG. 12 illustrates an example of the changes made at the reference machine 700 that are representative of the desired changes needed at the destination machine 800, utilizing delta patching. FIG. 12 illustrates how a number of software components within software stack 731 on reference machine 700 have been changed. Again, such changes may be desired for any of a number of reasons including an entirely new operating system, new security patches, new associated peripheral device patches from third party vendors, a completely new software component to add all together, and the like.

Software stack 731 in FIG. 12 may illustrate an example of a new version of a software stack to be utilized on a plurality of destination machines associated with the reference machine. Prior to the updates to the software components on the destination machine, the destination machine 800 may be implementing a previously received version of the software stack. In this example, the destination machine is implementing version 1.0 of the software stack. And, in this example, the reference machine 700 illustrated in FIG. 12 is creating a new version, version 2.0, for migration to the destination machine 800.

Image 891, the image associated with version 1.0, may have been generated as described above. Similarly, an image may be generated that is associated with version 2.0, including all the changed software components. As described herein, an entirely new image 891 need not be transmitted to the destination machine in order to have it implement version 2.0. By using delta patching, a delta patch file representing the differences between version 1 and version 2 may be transmitted via network 112, such as shown in the top row of FIG. 3. This file of the differences may be expected to be a smaller file than would an image file representing the full new version of the stack.

Figure 23:
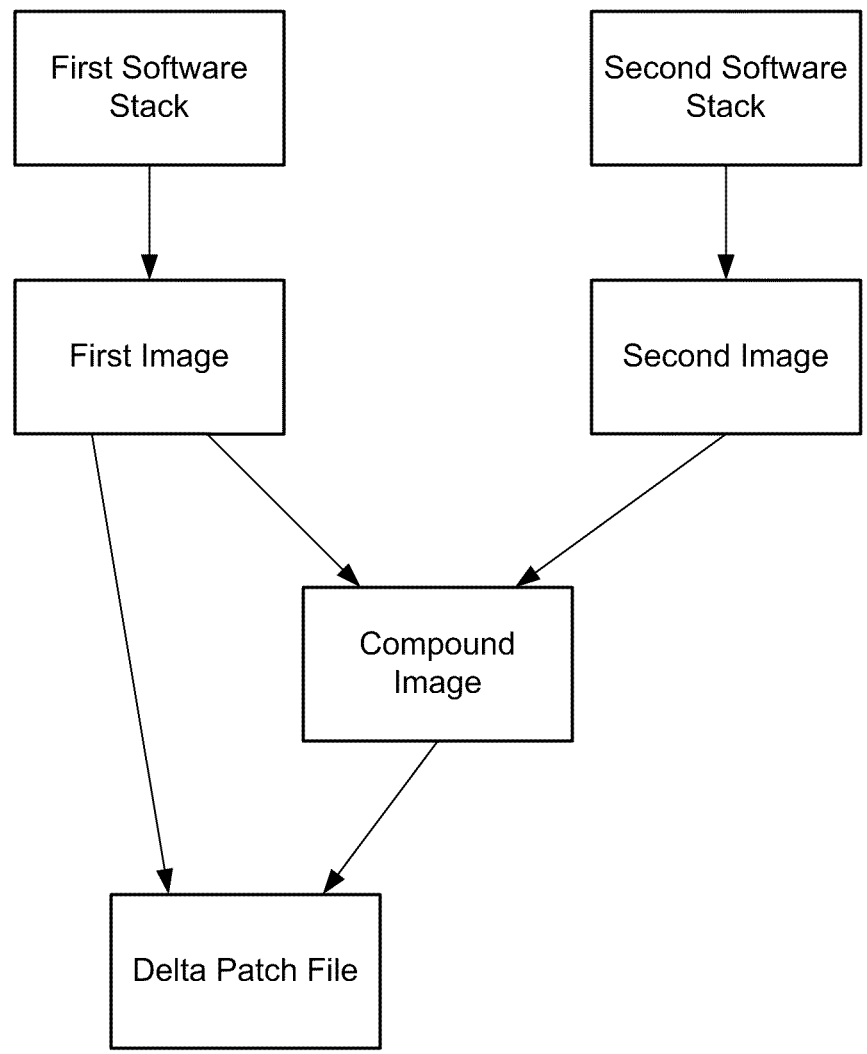
FIG. 23 is a functional block diagram showing an example of how a delta patch file may be created from two images.

As part of the process at the reference machine 700, and as shown by way of example in FIG. 23, a first image (e.g., the image associated with version 1.0 of the software stack) and a second image (e.g., the image associated with version 2.0 of the software stack) may be created from their respective software stacks, and then combined together into a compound image, such as by using known WIM single-instancing features. This compound image thus represents both the "before" version (version 1.0 in this example) and the "after" version (version 2.0 in this example) of the stack.

Once the compound image is created, a differencing of the compound image and an image of the "before" stack (in this example, version 1.0) is performed, which results in a delta patch file that represents the difference between the first and compound images. Such a comparison may determine the software components that are common or shared between the two versions, and may be performed by differencing software. This process of file-by-file comparison may utilize binary delta differencing.

As a result of the delta patching process, two items may be generated. First, the delta patch file representing the difference between the version 1.0 image and the compound image. Second, information referred to herein as a metadata catalog may be generated for use with the delta patch file. This metadata catalog may be separate from or may be included as part of the delta patch file. Additionally, where the metadata catalog is part of the same delta patch file, the metadata catalog may or may not be logically separate from the remainder of the delta patch file, e.g., from the portion of the delta patch file representing the actual changes in the files. The metadata catalog may identify, on a file by file basis, the correlation between a particular file as part of a software component and a version. For example, for three different files, the metadata catalog may indicate that file A is associated with version 1.0 only, file B is associated with both version 1.0 and version 2.0, and that file C is associated with version 2.0 only. As such, a construct may be created that separately identifies common files to both versions, e.g., file B above, and files unique to version 1.0, e.g., file A above, or version 2.0, e.g., file C above.

As a result, an entire new image need not necessarily be propagated to each and every destination machine that needs a major change to its resident software stack. The delta patch file, including or in addition to the metadata catalog file, and a task sequence for utilizing the delta patch file, may be the only information sent over network 112 to the destination machine(s). Because this delta patch file does not necessarily represent common portions between the resident version operating on the destination machine and the new version, the delta patch file sent to the destination machine may be expected to contain less information, and thus likely be smaller in size than would an image of the entire new version of the software stack. Thus, the overall time and resources to change the software stack on the destination machine may be lessened in comparison to completely transmitting a new image of the entire software stack for the new version.

Returning to FIG. 12, software stack 731 may illustrate an example of a new version, e.g., version 2.0, of a software stack to be utilized on a plurality of destination machines 800, associated with the reference machine 700, that are operating under a different version, e.g., version 1.0. In this example, the new version 2.0 software stack includes different software components that are only part of version 2.0.

In the example of FIG. 12, software components 1233*b*, 1235*f*, and 1237*c* may be software components that are only associated with version 2.0. The other software components, such as 733*g*, 735*a*, and 737*e*, may be software components that are common to both version 1.0 and version 2.0. Finally, although not shown in FIG. 12 since the software stack 731 in FIG. 12 is associated with version 2.0, software components 733*b*, 735*f*, and 737*c*, in FIG. 7, may be software components that are only associated with version 1.0.

With the new version 2.0 in the software stack 731 of the reference machine, a delta patch file 1291 may be created to account for the differences between version 1.0, currently operating on the destination machines, and version 2.0, the desired version to be operating on the destination machines. As previously noted, delta patch file 1291 may include a metadata catalog to identify the files of the software components that are associated with version 1.0 only, those associated with version 2.0 only, and those that are common to both version 1.0 and version 2.0. Thus, delta patch file 1291 in this example includes the files of software components associated with version 2.0 only, since they would not have been included in the original version 1.0 image 891, and the metadata catalog identifying the association of all files.

Figure 13:
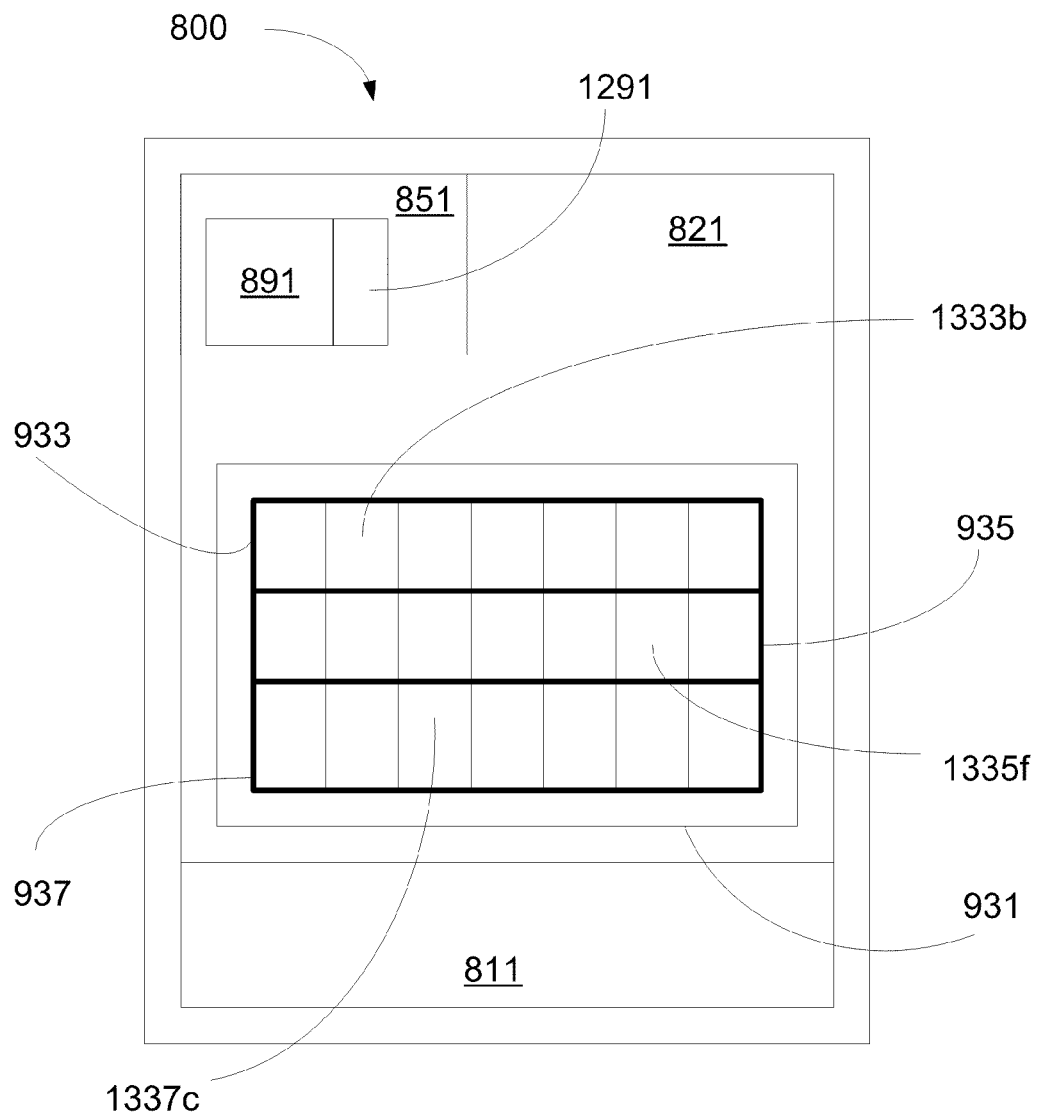
FIG. 13 illustrates an example where implementation of large-scale changes to the software stack of the destination machine, based upon the changes made to the reference machine, is performed.

Delta patch file 1291 may then be transmitted from reference machine 700 to the associated destination machines, such as destination machine 800 in FIG. 13, via network 112 for loading and implementation of the new version 2.0 of the software stack 931. A task sequence including instructions for using the delta patch file 1291 to update the stack local to the destination machine, may also be generated and sent using a software deployment infrastructure. FIG. 13 illustrates an example where implementation of a large scale change to the software stack 931 of the destination machine 800 based upon the changes made to the reference machine in FIG. 12 is desired.

Similar to the description of FIG. 8, the delta patch file 1291 may be maintained in the logically protected area 851 of the destination machine 800 in addition to the previously-stored stack image and any other previously-stored delta patch files. As previously described, logically protected region 851 of the hard drive 821 provides that when a certain command to clean the hard drive 821 of the destination machine 800 is executed, logically protected region 851 is not erased, modified, or affected. Only the portion of hard drive 821 that is not logically protected would be cleaned. Of course, the entire hard drive including the logically protected region could be erased if truly desired.

However, because logically protected region 851 is not normally erased in the situations described herein, logically protected region 851 may maintain data that will not be expected to be normally removed from the hard drive 821. In the example of FIG. 13, logically protected region 851 maintains original image 891 that represents the original software stack for version 1.0. It is also the current version of the software stack 931 operating on the destination machine 800.

Having received the delta patch file 1291 now stored in the logically protected area 851 of hard drive 821 on the destination machine 800, the patch may be applied to the software image 891 to recreate a compound image file that now contains both versions 1.0 and versions 2.0 of the software stack. Having recreated the compound image in protected region 851, the new software stack may be created onto the destination machine 800. The destination machine 800 may have cleaned the hard drive 821, except for the logically protected region 851. Either version 1.0 or version 2.0 of the software stack that is contained within the compound image may now be copied to the erased disk for the purpose of creating the software stack 931 on the hard drive 821.

Associated peripheral devices of the destination machine 800 then may have been operationally connected to the operating system within the software stack 931. The destination machine 800 may have been configured/personalized for the machine in question, such as serial numbers and other data for devices and components included. The delta patch file 1291, associated task sequence, and metadata catalog may additionally be utilized for installation of the newest version 2.0 of the software stack. The delta patch file 1291 is used earlier to update the image to the compound variant that contains both versions 1.0 and 2.0 of the software stack. Once the image file has been updated to the compound image, then both variants of the software stack are available in the compound image and which of the two is installed is captured in the task sequence.

In the example of FIG. 13, to change the software stack 931 so as to include the desired delta patch file 1291, a process for changing the software stack may occur. For this example, delta patch file 1291 may include the software components associated with version 2.0 for the software stack of the destination machine. As described above, a delta patch file updates the image file contained in 891 to contain a compound image containing versions 1.0 and 2.0. Then during execution of the installation task sequence, the appropriate version is used to install the destination software stack 931. To process the change to the software stack 931, the destination machine 800 first may be taken out of operation. Such a step may not be a physical move of the destination machine; rather, such a step may be a time where a customer of the destination machine cannot operate the destination machine for some type of self-service financial transaction.

With the destination machine taken out of operation, the task sequence for installation 1291 may be accessed to determine the manner for installation. In one example, the task sequence may specify the software components currently in the software stack 931 to de-install. In the example of FIG. 13, software components 933b, 935f, and 937c, may have been de-installed.

Next, the task sequence may specify to re-install the software components utilizing the software package 1291 stored in the logically protected region 851 that was previously received by the destination machine 800. This change is shown in FIG. 13 as software components 1333b, 1335f, and 1337c. To complete the process, the destination machine 800 is brought back into operation. Now, when a customer utilizes the destination machine, the new software components 1333b, 1335f, and 1337c are being utilized.

The process for sending a delta patch file 1291 described with respect to FIGS. 12 and 13 may be cumulatively repeated, and thus may further apply to additional software stack versions that need to be applied to a destination machine 800. Following the description of FIG. 13, an additional delta patch file may be received at the destination machine 800 that includes an additional software stack version, such as version 3.0. The newly received delta patch file, with associated task sequence and metadata catalog, allows for the software stack of the destination machine 800 to be changed to version 3.0. As such, a sequential chain of multiple delta patch files may be maintained in the logically protected region 851 of the hard drive 821 of the destination machine 800, each providing updates to the previous version in the chain. Although described as implementation of newer software stack versions, occasions may arise where it is desirous to revert back to a previous version of the software stack once operational on the destination machine 800. The following provides such an example situation.

Having loaded a new version 3.0 of a software stack 931 on a destination machine 800, a problem with the newly installed software component that was part of the version 3.0 upgrade may arise. For example, a security patch included as part of the version 3.0 software may cause a secondary problem not previously known or identified by an entity. For example, the newly installed software component associated with a cash scanning device for reading cash deposited by a user may have a problem where it does not recognize a certain denomination of bill, such as a $2 U.S. dollar bill.

An entity operating the destination machine may not have had this issue with a previous version of the software stack. As such, it may be desirous for an entity to change the version of the software stack operational on the destination machine back to a previous version of the software stack that is known to have been operational. In such a situation, a new file may be sent to the destination machine that is only a task sequence for installation. In such a case, the new task sequence may be instructions for cleaning out the hard drive 821, but for the logically protected region 851, and loading an older version of the software stack, such as version 1.0 or version 2.0, as the current/operative software stack 931 for the destination machine.

In loading the new software stack, the task sequence also may include instructions for loading other software components of version 3.0 that did not have errors associated with their implementation. As such, the resultant software stack 931 of the destination machine 800 may include a modified version of software stack 3.0 where the error prone software component is not installed. By utilizing various delta patch files and various task sequences, the software stack of a destination machine may be changed in any of a number of different manners, including modified versions of the software stack received from a reference machine.

Figure 14:
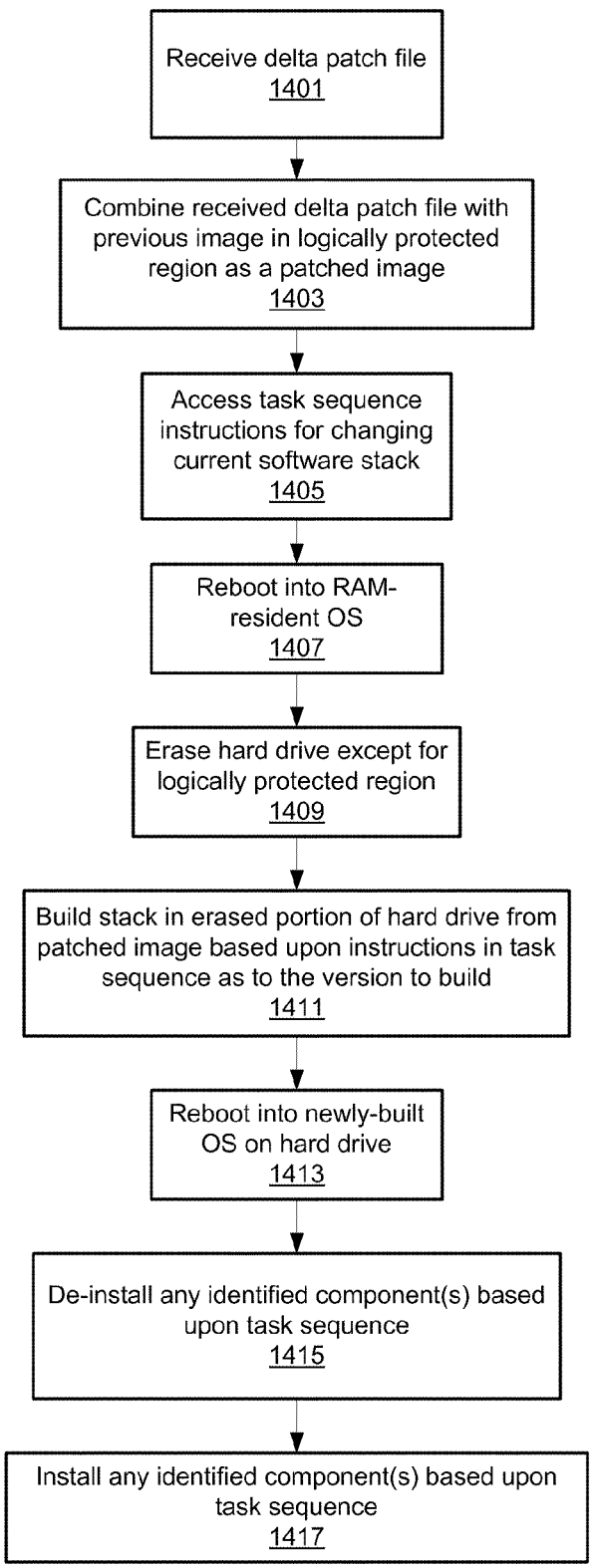
FIG. 14 is an example flowchart of a method for installing a new version of a software stack at a destination machine.

FIG. 14 is an example flowchart of a method for installing a new version of a software stack at a destination machine. The process starts and at 1401, a delta patch file may be received by a destination machine. As described herein, the delta patch file may be delta patch file 1291 and the destination machine may be destination machine 800 as described with respect to FIGS. 12 and 13 above. Proceeding to 1403, the received delta patch file may be combined with the previous image currently maintained in a logically protected region of a hard drive of the destination machine, such as by applying a patch to the existing image that is a file-based disk image file, such as a WIM file, with the delta patch file to create a new desired WIM file. Software may be utilized for combining the received delta patch file with the previous image. This logically protected region may be logically protected region 851 in hard drive 821 of destination machine 800 as previously described.

The delta patch file may represent changes to software components for use in rebuilding the current software stack of the destination machine, a metadata catalog identifying, on a file by file basis, the correlation between a particular file as part of a software component and a version, and a task sequence for installation of a desired software stack on the destination machine. The task sequence may be part of the delta patch file or separate from the delta patch file. As described above, after application of the received delta patch file, the image stored in the logically protected region of the hard drive now may contain an additional logical version of the software stack, e.g., if the image contained just version 1.0 of the software stack prior to application of the delta patch file, then it will contain both versions 1.0 and 2.0 after application of the delta patch file. Repeating the process, if a subsequent delta patch file is distributed and applied, the image in the protected region of the hard drive will now contain three versions of the software stack, e.g., versions 1.0, 2.0 and 3.0.

At 1405, the task sequence may be accessed to determine the instructions for changing the current software stack operating on the destination machine. As part of the instructions of the task sequence, the destination machine may be rebooted into a memory (e.g., RAM)-resident operating system in 1407. By rebooting in the memory-resident operating system, in 1409, the hard drive of the destination machine may be cleaned. The entire hard drive may be cleaned except for the logically protected region of the hard drive. By cleaning/erasing the hard drive, but for the logically protected region, an entirely new software stack may be built on the destination machine.

Proceeding to 1411, a software stack may be built in the erased portion of the hard drive from the patched image stored in the logically protected region of the hard drive based upon instructions in the task sequence as to the version to build. For example, the patched image may include multiple versions of a software stack. The task sequence instructions may indicate to build version 2.0 that is included in the patched image. As such, version 2.0 of the software stack may be built as the software stack of the destination machine. Proceeding to 1413, the instructions of the task sequence may instruct the destination machine to be rebooted into the newly-built operating system of the software stack.

At this point, the software stack of the destination machine may be operating under the specific version identified in the task sequence, such as version 2.0. In 1415, the task sequence may include additional instructions for de-installing any identified software component(s). In upgrading to a version 3.0, for example, a determination may be made as to the software components common to version 2.0, currently in operation, and version 3.0, the desired version to be loaded, as well as the software components for version 3.0 only. Those software components for version 3.0 only may be identified and, the corresponding software components for version 2.0 may be de-installed in 1415. In 1417, the identified software components for version 3.0 only may then be re-installed in place of the de-installed version 2.0 software components. Following the flowchart of FIG. 14, the software stack of the destination machine may operate in accordance with the desired version, such as version 3.0. This de-installation of 1415 and reinstallation of 1417 of individual components that occurs during incremental and cumulative updates is driven by the composition of software manifests. A delta patch file provides for the efficient distribution of change and to allow for updating the image file on a destination machine.

Figure 24:
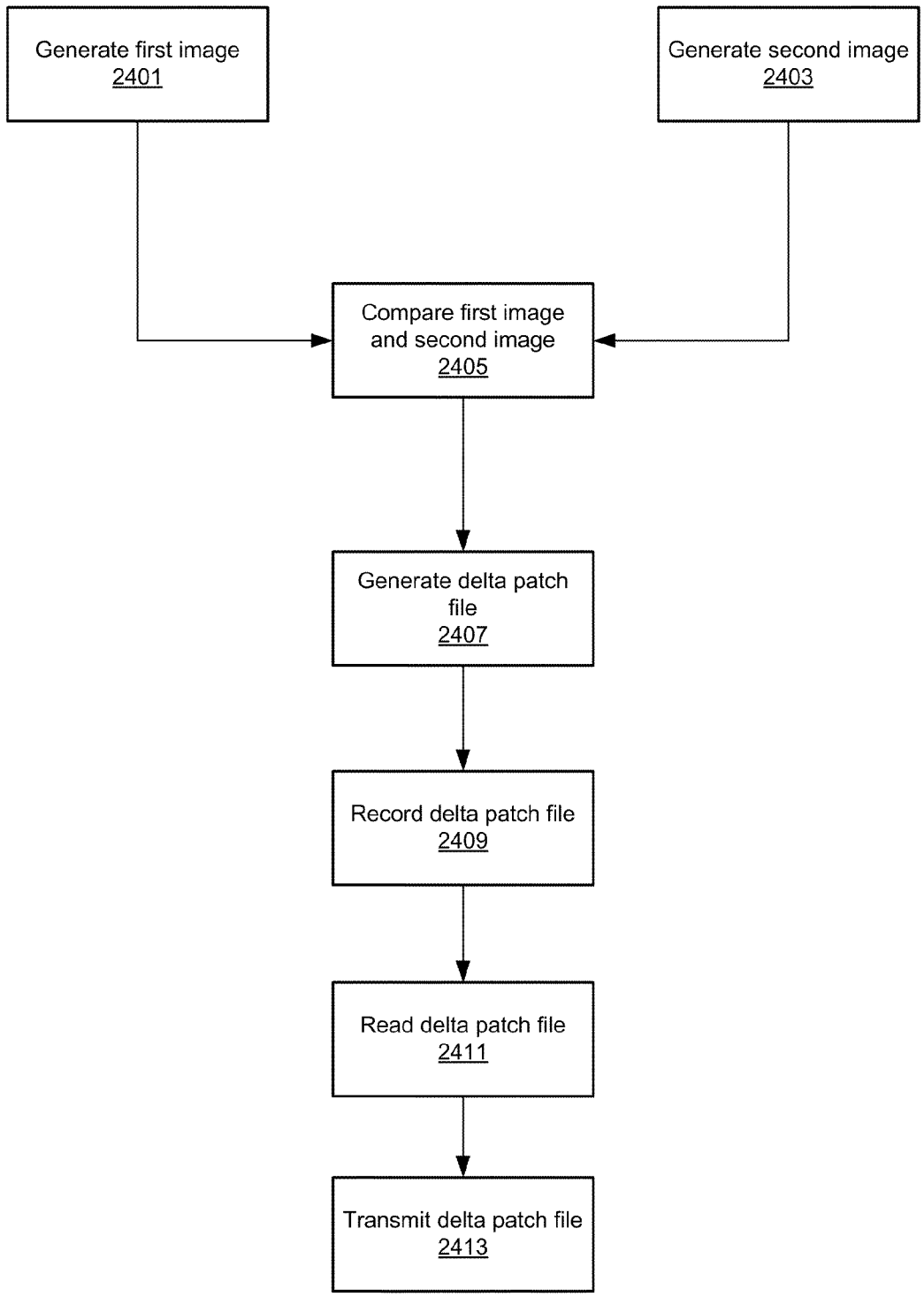
FIG. 24 is an example flowchart of a method for generating a delta patch file at a reference machine.

In another example, a delta patch file may be generated for reducing the number of versions of a software stack maintained on destination machines. FIG. 24 illustrates an illustrative example for generating a delta patch file when there is a desire to reduce the number of versions of a software stack currently maintained on a destination machine in the field. Any of a number of reasons may exist for reducing one or more versions of a software stack included in an image in a destination machine. In one example, a flaw in a version of the software stack that was previously distributed to the destination machine and saved in an image on the destination machine may be found and there may be a desire to completely remove the version from the destination machine. Another reason for reducing the number of versions stored at a destination machine may be due to limited data storage capacity at the destination machine. Thus, where some earlier versions of the software stack are likely no longer needed, it may be desirable to free up storage space by removing those earlier versions.

In FIG. 24, at 2401, a first image representative of a plurality of software stack versions may be generated and stored at reference machine 700. At 2403, a second image representative of at least one and less than all of the plurality of software stacks represented by the first image may be generated and stored at the reference machine 700. For example, the first image may represent versions 1.0, 2.0, and 3.0 of a software stack, and the second image may represent versions 2.0 and 3.0 of the software stack, but not version 1.0. In such an example, there may be a desire to remove the version 1.0 of the software stack, such as to free up data storage space in the destination machine.

At 2405, the first image and the second image may be compared to determine a difference between the second image and the first image. The comparison may be made by the reference machine, such as by using software to perform binary delta differencing. Proceeding to 2407, a delta patch file may be generated as a result of the comparison, which may be representative of the difference between the second image and the first image. As part of the process of generating the delta patch file, a task sequence associated with the third file may be generated. The task sequence may include instructions for using the delta patch file to create an image identical to the second image on the destination machine.

In 2409, data representing the delta patch file may be recorded to a computer-readable storage medium, such as an optical disc, a removable memory storage device such as a flash RAM device, or a hard drive associated with the reference machine. Any of a number of different computer-readable storage media may be utilized. As needed, in 2411, the recorded data representing the delta patch file may be read, and, in 2413, the read data may be transmitted to a destination machine.

Figure 25:
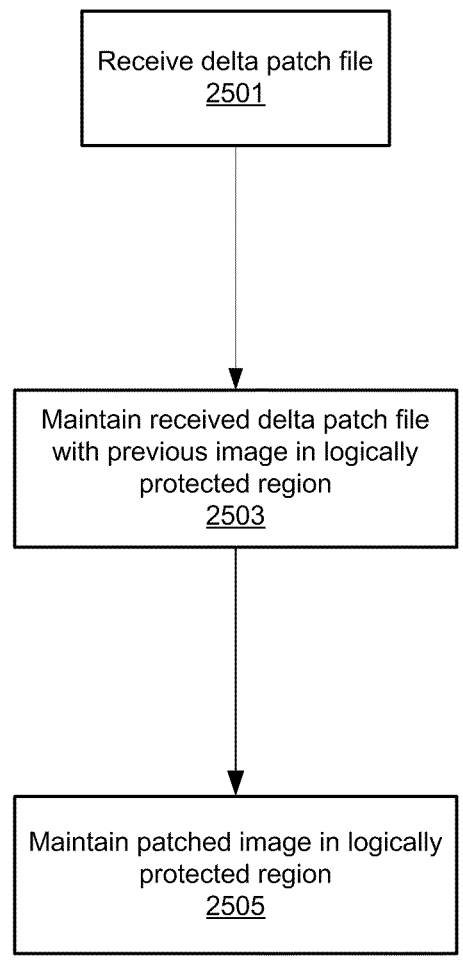
FIG. 25 is an example flowchart of a method for installing a delta patch file at a destination machine.

FIG. 25 is an example flowchart of a method for installing at a destination machine (e.g., SSFTD 100) the received delta patch file generated in connection with FIG. 24. In 2501, the delta patch file may be received at the destination machine. In 2503, the received delta patch file may be maintained with a previous image in the destination machine identical to the first image at the reference machine 700. The received delta patch file and the previous image may be maintained in a logically protected region of a hard drive of the destination machine. Such a logically protected region may ensure that the content of the logically protected region is not erased when the hard drive content of the destination machine is cleaned.

The received delta patch file may be processed by for the purposes of applying a patch to the previously stored image file. The previous image may be maintained as a file-based disk image file, such as a WIM file, and by utilizing software as described herein, a new patched image file may be maintained as a file-based disk image file, such as a WIM file in 2505. Thus, the new patched WIM file with fewer software stack versions may be maintained in the destination machine. The new patched image file may be maintained in the logically protected region of the hard drive of the destination machine. Referring to the above example, where the previous image represents versions 1.0, 2.0, and 3.0 of a software stack and the new patched image represents versions 2.0 and 3.0 of the software stack, the resulting removal of the version 1.0 of the software stack frees up data storage space in the destination machine.

Figure 26:
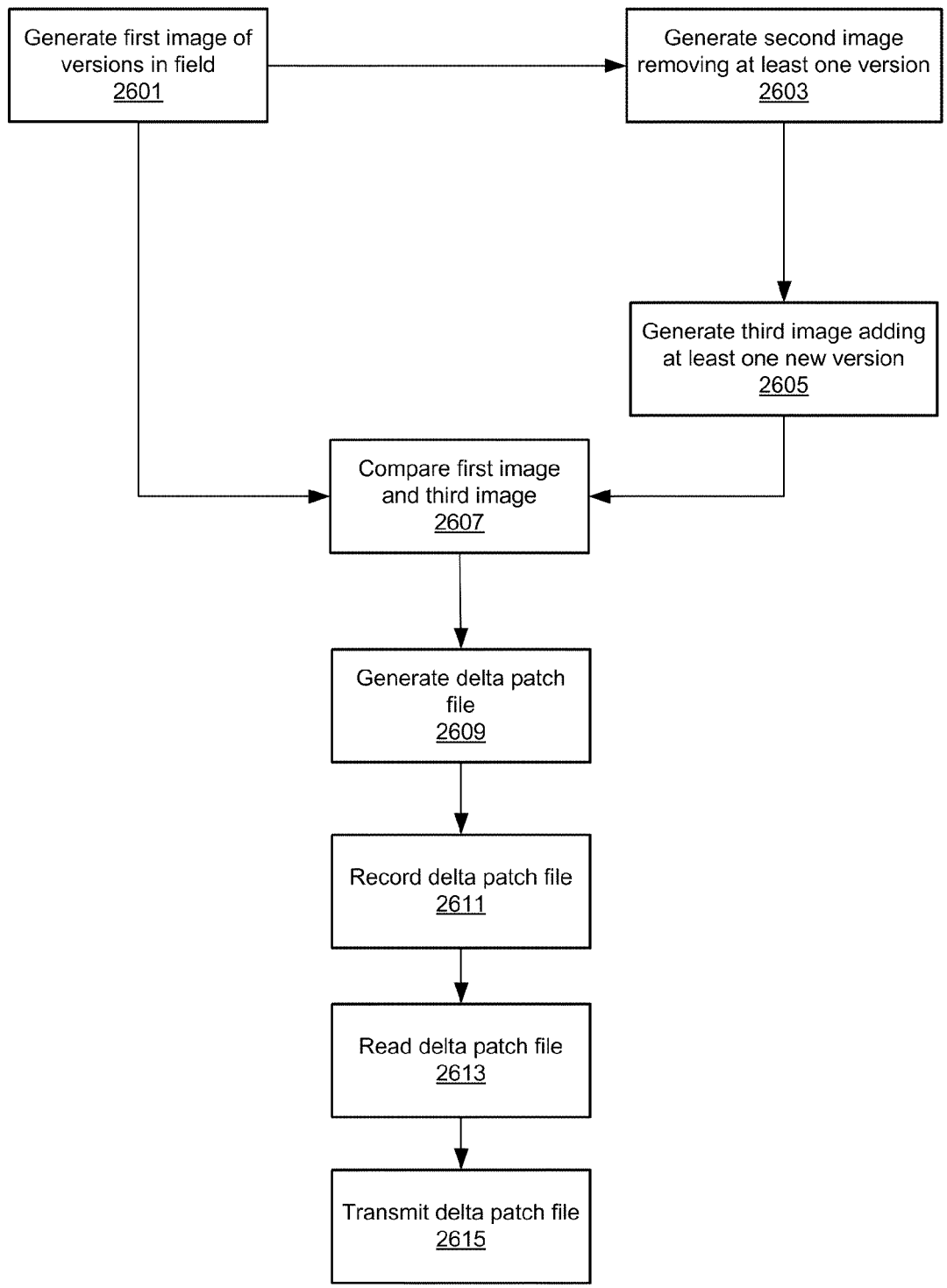
FIG. 26 is another example flowchart of a method for generating a delta patch file at a reference machine.

In yet another example, a delta patch file may be generated for both removing one or more previously stored versions of a software stack maintained on destination machines and adding one or more new versions of the software stack to the destination machines. FIG. 26 illustrates an example for generating a delta patch file when there is a desire to remove a previously stored version of a software stack currently maintained on a destination machine in the field and to add a new version of the software stack. Any of a number of reasons may exist for a need to remove a previously stored version of a software stack included in an image in a destination machine while simultaneously adding a new version. In one example, a flaw in a previously stored version of the software stack that was previously distributed to the destination machine and saved in an image on the destination machine may be found and there may be a desire to completely remove the version from the destination machine and add a new replacement version in its place.

Figure 28:
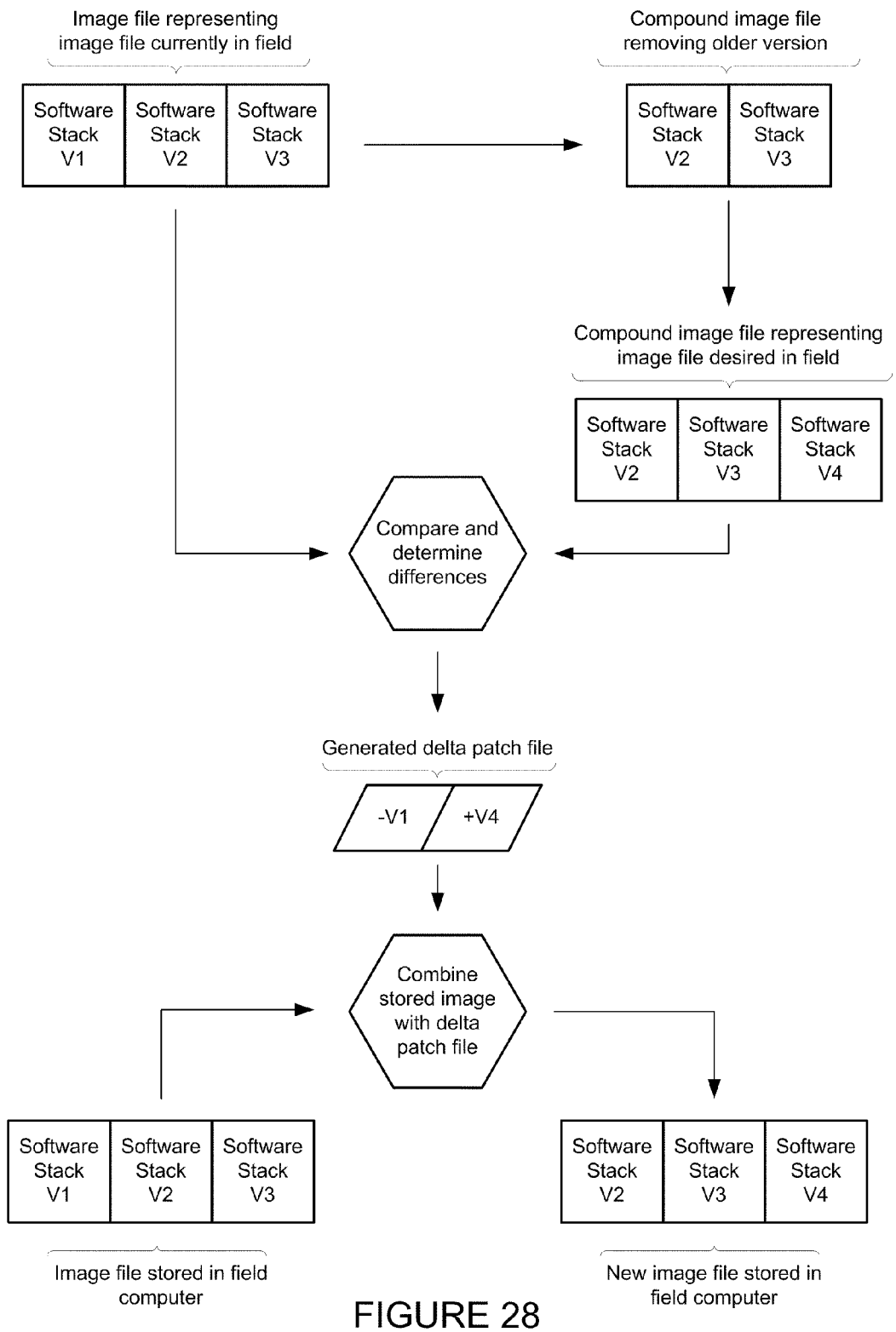
FIG. 28 is a functional block diagram showing an example of how a delta patch file may be generated, distributed, and utilized from a reference machine to a destination machine.

In FIG. 26, at 2601, a first image representative of a plurality of versions of a software stack may be generated and stored at reference machine 700. At 2603, a second image representative of at least one and less than all of the plurality of versions of the software stack may be generated and stored at the reference machine 700. In one example as shown in FIG. 28, the first image may represent versions 1.0, 2.0, and 3.0 of a software stack (which would also be the image file currently expected to be "in the field" at the target destination machine), and the second image (a compound image removing version 1.0) may represent versions 2.0 and 3.0 of the software stack. In such an example, there may be a desire to remove the version 1.0 of the software stack to free up memory space in the destination machine. Returning to FIG. 26, at 2605, a third image representative of at least one new version of the software stack may be generated and stored at the reference machine. In example shown in FIG. 28, the third image may be a compound image of an image of version 4.0 of the software stack and the second image, which represents versions 2.0 and 3.0. The resulting third image would thus represent a plurality of versions of the software stack (specifically in this case, versions 2.0, 3.0, and 4.0) as desired to be deployed to the target destination machine(s).

Referring again to FIG. 26, at 2607, the first image and the third image may be compared by the reference machine 700 to determine a difference between the third image and the first image. The comparison may be made by the reference machine, such as by using software to perform binary delta differencing. Proceeding to 2609, a delta patch file may be generated as a result of the comparing, which may be representative of the difference between the third image and the first image. As shown in FIG. 28, the generated delta patch file may include data representing the removal of version 1.0 and the addition of version 4.0 to the image stored on the destination machine in the field. As part of the process of generating the delta patch file, a task sequence associated with the delta patch file may be generated. The task sequence may include instructions for using the delta patch file on the destination machine to generate the appropriate software stack.

In 2611 of FIG. 26, data representing the delta patch file may be recorded to a computer-readable storage medium, such as an optical disc, a removable memory storage device, such as a flash RAM device, or a hard drive associated with the reference machine. Any of a number of different computer-readable storage media may be utilized. As needed, in 2613, the recorded data representing the delta patch file may be read, and, in 2615, the read data may be transmitted to a destination machine.

Figure 27:
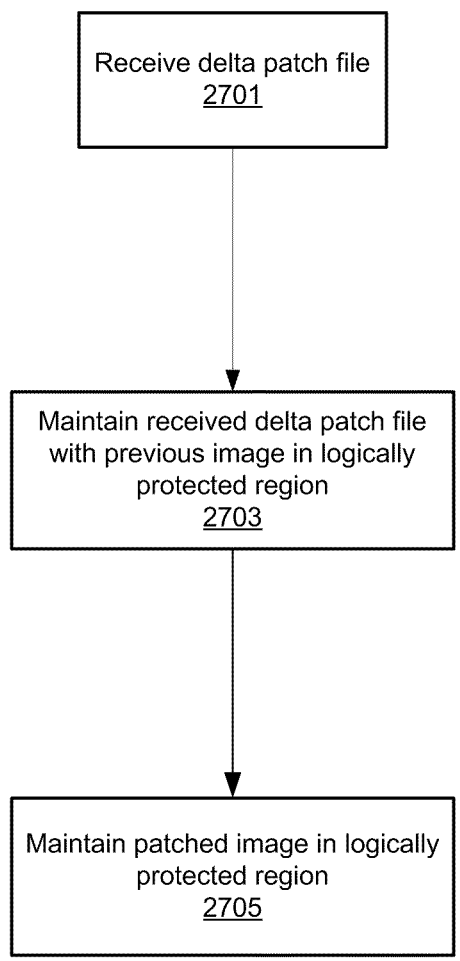
FIG. 27 is another example flowchart of a method for installing a delta patch file at a destination machine.

FIG. 27 is an example flowchart of a method for installing the delta patch file created in connection with FIG. 26 at the destination machine. In 2701, the delta patch file is received at the destination machine. In 2703, the received delta patch file may be maintained with a previous image in the destination machine. The received delta patch file and the previous image may be maintained in a logically protected region of a hard drive of the destination machine. Such a logically protected region may ensure that the content of the logically protected region is not erased when the hard drive content at the destination machine is erased.

The received delta patch file may be processed by software for the purposes of applying a patch to the previously stored image file. The previous image may be maintained as a file-based disk image file, such as a WIM file, and by utilizing software as described herein, a new patched image file may be maintained as a file-based disk image file, such as a WIM file. Thus, the new patched WIM file with one removed software stack version and one added software stack version may be maintained in the destination machine. The new patched image file may be maintained in the logically protected region of the hard drive of the destination machine. In one example, the previous image may include versions 1.0, 2.0, and 3.0 of a software stack and the new patched image may include versions 2.0, 3.0, and 4.0 of the software stack, as shown in FIG. 28.

Generating Task Sequences and their Use in Propagating Reference Stack Updates

As has already been discussed, a current version of the reference stack may be generated at reference machine 700, which may then be propagated out to the SSFTDs in a number of different ways. To accomplish this, the SSFTDs will need not only the stack updates (e.g., in the form of images, delta patch files, and/or installer components, depending upon the type of update), but also instructions as to how to make those updates locally at the SSFTDs. The present section will discuss those instructions, also referred to herein as task sequences, in greater detail. In addition, this section will discuss another task sequence, called herein a reference stack task sequence, for building the reference stack at reference machine 700. Moreover, as will be discussed, any or all of these task sequences may be generated in an automated manner to potentially reduce or even minimize human interaction (and the corresponding opportunities for human error). This may be desirable where updates occur frequently and providing a large software update team to create the task sequences and build the updated versions of the reference stack is simply not economical.

Returning again to a brief description of the software stack, the reference software stack on the reference machine (and subsequently propagated to and installed on the SSFTDs) may be a multilayered composition comprising an operating system, a device management layer, an application layer, and miscellaneous software applications to support maintenance, software distribution, monitoring and security. It may be expected that the service provider itself is not necessarily qualified to generate all of the software components that make up these layers, and/or it would not be efficient for the service provider itself to generate the software components directly. Accordingly, it may be expected that some or all of the software components may originate from multiple different vendors. For example, a first vendor may provide device management components (e.g., XFS) while a second vendor may provide components in the application layer.

The composition of a fully constituted software stack may be effected using, for example, a deployment toolkit, to orchestrate the installation of each component on the target system. The toolkit provides a graphical user interface (GUI) for creation and modification of task sequences, but may not be well-suited to making large scale repetitive updates such as those provided by the various vendors during each release cycle. Making those updates via a GUI may be simply too time consuming and error prone. Instead, software deliveries from our vendors may be accepted in a highly regularized format, and certain task sequences may be programmatically created and/or updated in accordance with those deliveries.

For instance, vendors may deliver three specific artifacts (e.g., in the form of data stored on a computer-readable medium) with every software release:

1) Software components—these may be delivered, for example, in installer files.
2) Documentation—this may characterize what is new with each release and what is used to drive testing.
3) Manifests—these are documents that may describe the order in which components should be installed, the commands used to carry out the installation, and in some cases, expected environmental preconditions such as which operating system services should be started or stopped for the installation to proceed properly.

These artifacts may be processed so as to generate a task sequence for fully building the software stack on the reference machine from scratch. The task sequence may be a set of instructions, such as computer-readable instructions (e.g., XML format), and may be generated manually and/or automatically. This reference stack task sequence may include instructions for installing each of a plurality of software components, one by one, in a particular order into the software stack on the reference machine.

The manifests, software installer components, and documentation may be used to programmatically generate the reference stack task sequence in the following example manner. For each software component in the stack, the deployment toolkit development environment on the reference machine may track the associated installer component, the associated application meta-data file (which may be, e.g., an XML file), and the order in which the software component should be installed relative to the other software components. The following sequence of events may thus be executed programmatically to update a pre-existing reference stack task sequence (or for creating a new reference stack task sequence from scratch).

First, a validation check may be performed. The reference machine may be configured to programmatically iterate across each vendor-provided manifest and compare the version number captured in the manifest with the version number embedded in the accompanying installer files. This is because version numbers are captured in two places and it is desirable to check that the versions are consistent.

Next, the installer file may be copied to the commercially available software file share inside a folder with the same name as the component. Then, a programmatic update may be made to the deployment toolkit's applications metadata file to capture application metadata. Where a pre-existing reference stack task sequence is to be updated, a comparison of that reference stack task sequence and the manifests may be performed, to determine the changes that need to be made to the reference stack task sequence. Where a new reference stack task sequence is to be created from scratch from the manifests, then the comparison may be skipped.

If a new reference stack task sequence is to be created, then it is created based on the manifests. If a pre-existing reference stack task sequence is to be updated, then based on the changes determined during the comparison, an update may be made to the reference stack task sequence by modifying portions of the reference stack task sequence. For instance, where the component already exists, the update for that component may be made be "in-place." Or, where the reference stack task sequence (e.g., an XML file) contains more components that those described in each vendor provided manifest, the manifest processing may first excise the relevant vendor instructions (thus deleting them from the task sequence) and then replace them with a new set, leaving all other instructions in place. Or, where additional components are to be added, corresponding instructions from the manifests are added to the reference stack task sequence.

Once the reference stack task sequence has been generated, the reference machine 700 may execute the reference stack task sequence to build the reference stack. The reference machine 700 may also store the task sequence as data on a computer-readable medium.

Once the reference stack has been built, there are several ways of propagating the current software stack to the SSFTDs, depending upon the significance of the changes to the software stack as compared with the previous version of the software stack, as well as the current state of a given SSFTD. In general, the current software stack may be propagated out to a given SSFTD in one of two ways: (1) sending an image of the full software stack, or, as will be described further, sending a file representing changes to the full software stack as compared with the previous version of the software stack; and (2) sending the installers for those software components that have been removed, added, or modified. Using the first method (sending image of software stack or file of the changes), it may or may not be assumed that the target SSFTD already has a viable image of the previous version of the software stack. Using the second method (sending the installers of just the affected components), it is assumed that the target SSFTD in fact has a viable image of the previous version of the software stack.

For each of the above two methods, a task sequence for use by the target SSFTD may also be generated and sent to that SSFTD. That task sequence instructs the SSFTD how to use the image, file, or installers being provided. Depending upon the propagation method used, there may be three types of such task sequences sent to the SSFTD: (A) a re-imaging task sequence for instructing the SSFTD how to build a software stack using the image or file being sent; (B) an incremental task sequence for instructing the SSFTD how to modify the existing software stack in the SSFTD using the installers being sent; and (C) a cumulative task sequence for instructing the SSFTD how to re-build its software stack from an existing image of the software stack and to then utilize the installers. Thus, the re-imaging task sequence may be used with method (1) above, and the cumulative and incremental task sequences may be used with method (2) above.

Not only may the reference stack image for use by the reference machine 700 be programmatically created from the manifests, but so may any task sequences needed for the incremental update function and the cumulative update function, for use by the SSFTDs.

For the incremental update task sequence, as with the reference stack task sequence, the deployment toolkit environment may also be updated programmatically with reference to manifests. A difference in this case is that the desired incremental task sequence is generated with reference to two different sets of manifests—one representing the desired state of the reference software stack, and the other representing the state in which the reference software stack currently resides. Programmatic analysis of the two manifests (previous state versus desired state) may allow the differences thereof to be decomposed into three distinct categories:

a) Components that exist in the new set of manifests, but not the old set of manifests. These are new components that will need to be installed on the SSFTDs during the update.
b) Components that exist in the old set of manifests, but not in the new set of manifests. These are components that will need to be de-installed from the SSFTDs during the update.
c) Components that exist in both sets of manifests, although with different version numbers of the components. These are components that will need to have the old version de-installed, and then the new version installed, on the SSFTDs during the update.

This basic analysis yields two sets of components—those that need to be de-installed, and those that need to be installed. These two lists may be further processed so that the incremental task sequence file is updated to execute the de-installations first (taking care to do so in the reverse order they are expressed in the previous-state manifests), then executing the installations in the order they are expressed in the desired-state manifests.

For the cumulative update task sequence, this is a task sequence that is a hybrid sequence that first re-images the SSFTD to a known software stack version, using an image that has been previously deployed to the SSFTD, and then updates the SSFTD incrementally in the same manner as the incremental update task sequence, again using installer components that have either been previously deployed or are sent along with the cumulative update task sequence.

The basic analysis is very similar to that used to generate the incremental update task sequence. In particular, the creation is performed by comparing the manifests that characterize the desired software revision level and generating a set of instructions that de-install, and then install, software components. The logistics of determining what components are de-installed and installed are essentially the same as described above with regard to the incremental update task sequence. There is a difference, however, in that the cumulative update task sequence also handles installing and configuring the base stack image prior to performing the incremental update function.

Figure 4:
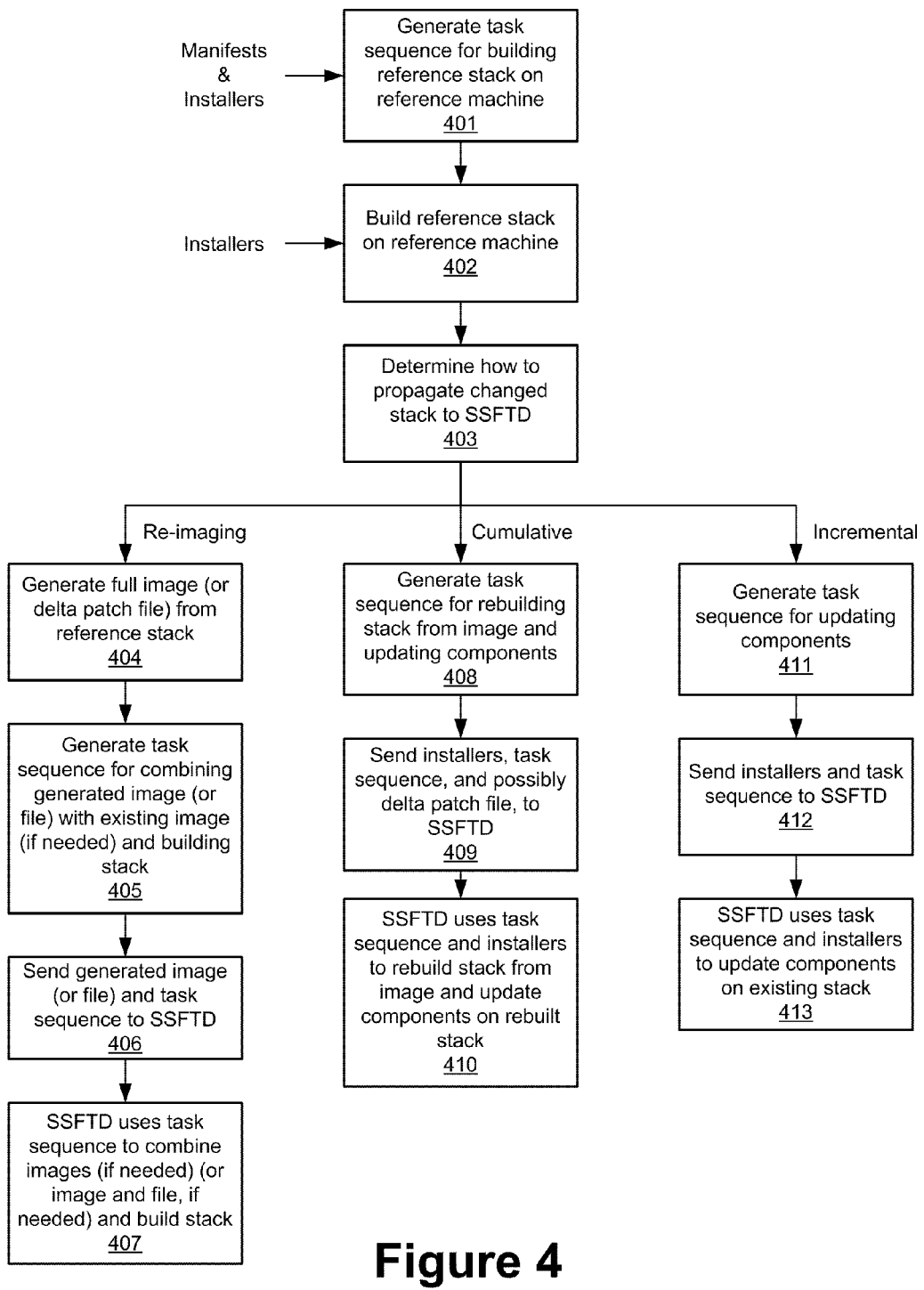
FIG. 4 is a flow chart showing an illustrative process for building a reference stack and propagating stack updates and task sequences to SSFTDs.

An example of how these task sequences are generated and propagated to the SSFTDs in connection with the two methods of stack propagation will be described in connection with FIG. 4. In block 401, the reference machine 700 generates the reference stack task sequence for building the reference stack, as discussed above, and in block 402, the reference software stack is built at the reference machine 700 using the reference stack task sequence, as described previously.

In block 403, the reference machine determines how to propagate the most recent version of the reference software stack to an SSFTD. This determination may be based on, for example, the current state of the SSFTD software stack and/or on how significant/large the changes are to the reference software stack as compared with the previous version of the reference software stack. Depending upon the decision in block 403, the process follows one of the following paths: blocks 404-405-406-407 (re-imaging path), or blocks 408-409-410 (cumulative update path), or blocks 411-412-413 (incremental update path).

If the re-imaging path is chosen, then in block 404, the full image and/or a delta patch file is created from the reference stack by reference machine 700, as discussed in detail elsewhere in the present disclosure. Next, in block 405, a re-imaging task sequence is generated (such as by the programmatic/automatic creation discussed elsewhere herein) that instructs the SSFTD how to utilize the sent full stack image or delta patch file. In block 406, the task sequence and the relevant image or file are sent to the SSFTD. In block 407, the SSFTD stored the task sequence and image or file in the logically protected area of its hard drive, and uses the task sequence to generate and/or update the stack located on the hard drive of the SSFTD.

If the incremental update path is chosen, then in block 411 an incremental update task sequence is created (such as by the programmatic/automatic creation discussed elsewhere herein) that instructs the SSFTD how to use certain installer components. Then, in block 412, the task sequence and installer components are sent to the SSFTD. In block 413, the SSFTD stores the task sequence and installer components in the logically protected region of its hard drive, and uses the task sequence to update the stack located on the hard drive of the SSFTD.

Figure 20:
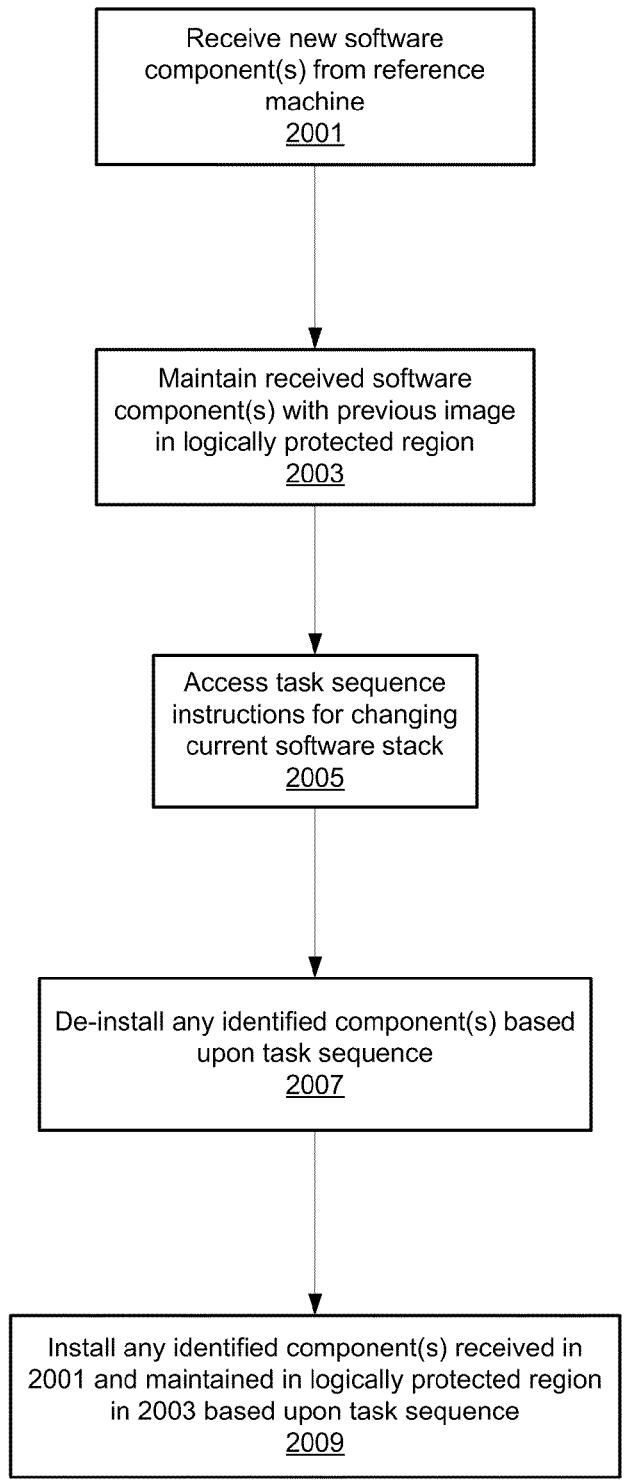
FIG. 20 is an example flowchart of a method for installing a new version of a software stack at a destination machine.

FIG. 20 is an example flowchart of a method for installing a new version of a software stack at a destination machine by the incremental update process, in accordance with the incremental update task sequence. The process starts and at 2001, one or more new software components may be received by a destination machine. Proceeding to 2003, the received one or more software components may be maintained with a previous image currently maintained in a logically protected region of a hard drive of the destination machine. This logically protected region may be logically protected region 851 in hard drive 821 of destination machine 800 as previously described. The one or more software components may be used in rebuilding the current software stack of the destination machine. The incremental update task sequence for installation of a desired software stack on the destination machine may also be included.

At 2005, the incremental update task sequence may be accessed to determine the instructions for changing the current software stack operating on the destination machine. In 2007, the task sequence may include additional instructions for de-installing any identified software component(s) in the current software stack of the destination machine. In 2009, the one or more identified software components may then be re-installed in place of the de-installed software components. Following the flowchart of FIG. 20, the software stack of the destination machine may operate in accordance with the desired version.

Returning to FIG. 4, if the cumulative update path is alternatively chosen, then in block 408 a cumulative update task sequence is created (such as by the programmatic/automatic creation discussed elsewhere herein) that instructs the SSFTD how to use rebuild the stack from a stored image and to update that image using certain installer components. Then, in block 409, the task sequence, and the installer components and/or image as needed are sent to the SSFTD. In block 410, the SSFTD stores the task sequence, and if sent, the image and/or installer components, in the logically protected region of its hard drive, and uses the task sequence to update the stack located on the hard drive of the SSFTD.

Figure 21:
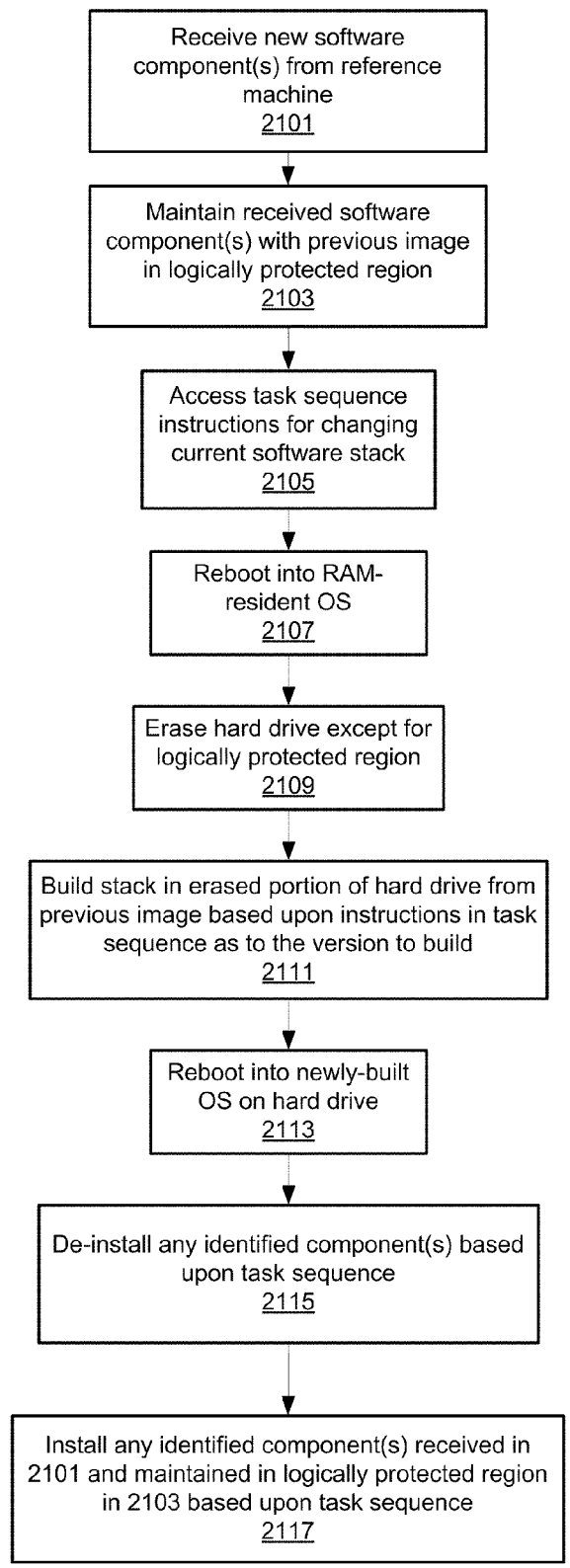
FIG. 21 is another example flowchart of a method for installing a new version of a software stack at a destination machine.

FIG. 21 is an example flowchart of a method for installing a new version of a software stack at a destination machine by the cumulative update process. The process starts and at 2101, one or more new software components may be received by a destination machine. Proceeding to 2103, the received one or more software components may be maintained with a previous image currently maintained in a logically protected region of a hard drive of the destination machine. This logically protected region may be logically protected region 851 in hard drive 821 of destination machine 800 as previously described. The one or more software components may be used in rebuilding the current software stack of the destination machine. The cumulative update task sequence for installation of a desired software stack on the destination machine may also be included.

At 2105, the cumulative update task sequence may be accessed to determine the instructions for changing the current software stack operating on the destination machine. As part of the instructions of the task sequence, the destination machine may be rebooted into a RAM-resident operating system in 2107. By rebooting in the RAM-resident operating system, in 2109, the hard drive of the destination machine may be cleaned. The entire hard drive may be cleaned except for the logically protected region of the hard drive. By cleaning/erasing the hard drive, but for the logically protected region, an entirely new software stack may be built on the destination machine.

Proceeding to 2111, a software stack may be built in the erased portion of the hard drive from the previous image stored in the logically protected region of the hard drive based upon instructions in the task sequence as to the version to build. For example, the previous image may include multiple versions of a software stack. The task sequence instruction may indicate to build version 2.0 that is included in the previous image. As such, version 2.0 of the software stack may be built as the software stack of the destination machine. Proceeding to 2113, the instructions of the task sequence may instruct the destination machine to be rebooted into the newly-built operating system of the software stack.

At this point, the software stack of the destination machine may be operating under the specific version identified in the task sequence, such as version 2.0. In 2115, the task sequence may include additional instructions for de-installing any identified software component(s). In 2117, the one or more identified software components may then be re-installed in place of the de-installed software components. Following the flowchart of FIG. 21, the software stack of the destination machine may operate in accordance with the desired version.

Figure 5:
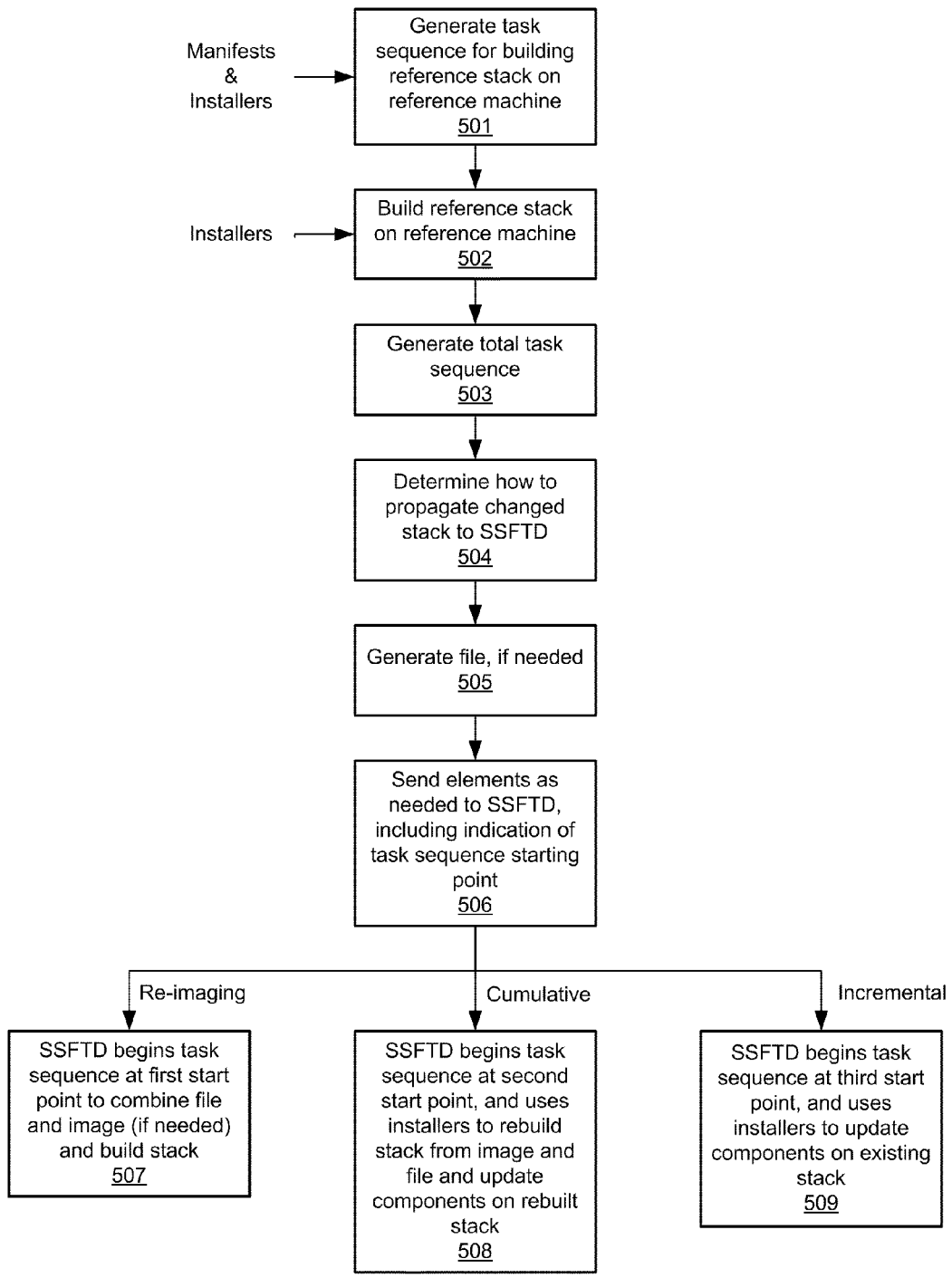
FIG. 5 is another flow chart showing an alternative illustrative process for building a reference stack and propagating stack updates and task sequences to SSFTDs.

FIG. 5 shows an alternative implementation, in which the three types of task sequences sent to the SSFTD may be combined into a single task sequence with different logical starting points for implementing the re-imaging, incremental update, and cumulative update functions. In this example, block 501 is identical to block 401, and block 502 is identical to block 402. Next, in block 503, a complete task sequence, including the re-imaging, incremental, and cumulative update functions, is created. Alternatively, a task sequence including only two of these functions may be created.

Next, block step 504, it is determined how to propagate any changes to the reference stack to the SSFTDs. Thus, in block 504, the reference machine, for example, determines whether the changes should be propagated as a re-imaging, as an incremental update, or as a cumulative update. In block 505, any full stack image or delta patch file is generated as needed, and in block 506 the appropriate task sequence and file and/or installer components are sent to the SSFTD.

Depending upon the decision in block 504, the process moves to either blocks 507, 508, or 509. If the decision is to re-image, then in block 507 the SSFTD begins executing the task sequence at a first start point to perform the re-imaging function described herein. If the decision is to perform a cumulative update, then the SSFTD begins executing the task sequence at a different second start point to perform the cumulative update function. If the decision is to perform an incremental update, then the SSFTD begins executing task sequence at yet a different third start point to perform the incremental update function. Thus, in block 506, an indication of the type of update to be performed, and/or an indication of the proper starting point in the task sequence, may also be sent to the SSFTD.

Figure 6:
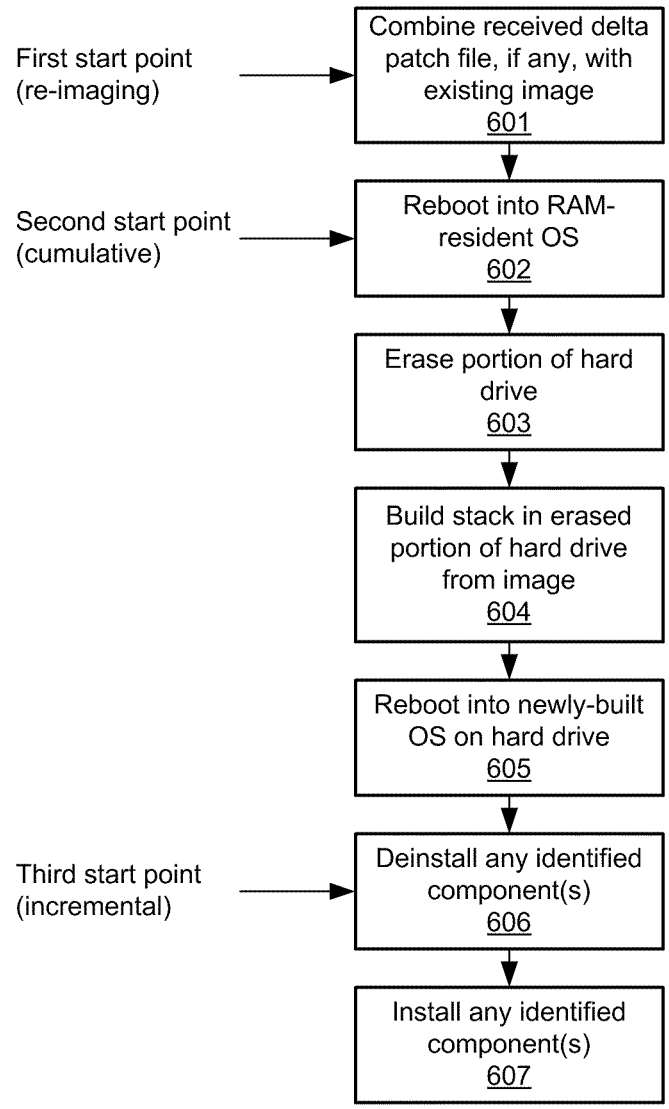
FIG. 6 is a flow chart showing illustrative functions that may be instructed by a task sequence for use by an SSFTD.

FIG. 6 shows an example of a combined task sequence as discussed in FIG. 5. The task sequence has instructions for performing various functions 601-607 in a particular order, such as the order shown. If the task sequence is begun at the first start point, then in this example the instructions for performing the functions of blocks 601-602-603-604-605-606-607 are performed in sequence. If the task sequence is begun at the second start point, then in this example the instructions for performing the functions of blocks 602-603-604-605-606-607 are performed in sequence. If the task sequence is begun at the third start point, then in this example the instructions for performing the functions of blocks 606-607 are performed in sequence.

In this example, the instructions may be as follows. The task sequence may include instructions (block 601) at the first start point (re-imaging start point) for combining the received delta file, if any with the image already stored in the logically-protected region. The task sequence may further include instructions (block 602) at the second start point (cumulative update start point) for rebooting the SSFTD into a RAM-resident operating system that may be stored in the logically-protected region. Next, the task sequence may include instructions (block 603) for erasing some or all of the hard drive except for the logically-protected region. Next, the task sequence may include instructions (block 604) for building the stack in the erased portion of the hard drive from the image stored in the logically-protected region.

Next, the task sequence may include instructions (block 605) for rebooting the SSFTD into the operating system of the newly-built stack in the formerly erased portion of the hard drive. Next, the task sequence may include instructions (block 606) at the third start point (incremental update start point) for de-installing any components in the stack identified as needing to be removed for the update. Next, the task sequence may include instructions (block 607) for installing any components to the stack identified as being needed for the update.

Local Provisioning of SSFTD Updates

The occasion may occur where the ability to change a software stack of a destination machine remotely via network 112 may not be desirable or possible. For example, situations arise where a destination machine must be serviced locally by a technician. Any of a number of reasons can occur for such a circumstance. For example, the network interface 108 or hard drive 102 may not be working properly, and thus the SSFTD may not be responsive to propagation attempts by the reference machine 700 via network 112. Or, the service technician may visit the SSFTD to repair the display 105, key pad 107, and the like. Any of these or a number of other reasons may warrant the need for a technician to be physically present at the SSFTD. Under such circumstances, a technician on site may be able to install a new image of a desired software stack physically on the destination machine. In such a case, time and resources for downloading a new image remotely can be removed since the technician may load a new image on site.

For example, after completing other necessary repairs on the SSFTD, the technician may transfer an image (such as image 891) to destination machine 800 (e.g., SSFTD 100) from the removable computer-readable medium 111, such as a compact disc or USB memory stick, using the removable media interface 109. In this situation, there may arise the problem that the version of the image on the computer-readable medium 111 is not current, up-to-date, or otherwise appropriate for the SSFTD he or she plans to load the image onto. A safeguard may be desired to ensure that a technician does not load an unauthorized image into the logically protected region of the hard drive of the SSFTD.

Figure 15:
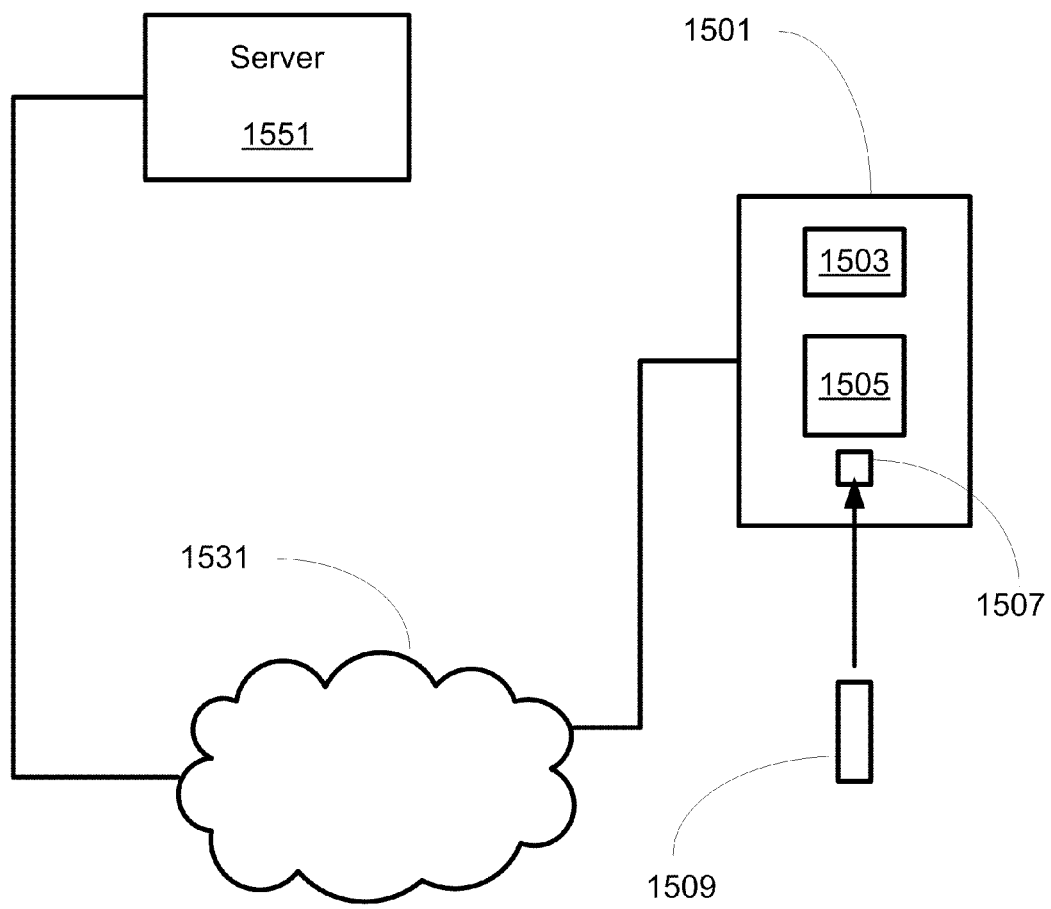
FIG. 15 illustrates an example system for authorizing an image stored on a removable memory source.

FIG. 15 illustrates an example system for authorizing an image stored on a removable memory source in accordance with one or more aspects of the present disclosure. FIG. 15 illustrates an example where a technician presently at a destination machine 1501 (e.g., one of SSFTDs 100A-C) may attempt to load an image stored on a removable memory source 1509 into a logically protected region 1505 of the destination machine 1501. Any of a number of different removable memory sources 1509 or other removable computer-readable media may be utilized including a USB memory stick, a compact disc (CD), and/or other portable memory source. A technician may attempt to load an image stored on portable memory source 1509 via a connection port 1507 on the destination machine 1501. Connection port may be coupled to or part of removable media interface 109. A conventional USB port is one form of connection port 1507 that may be utilized to act as a conduit for transfer between a portable memory source 1509 and a destination machine 1501.

In attempting to load an image stored on the portable memory source 1509 onto the logically protected region 1505 of the destination machine 1501, a confirmation of authorization to load the image may be performed. Destination machine 1501 may be configured to access an external server 1551. Such access to server 1551 may be through one or more networks 1531 (such as network 112), and external server 1551 may be controlled by and/or located at service provider 201. Upon accessing the server 1551, the destination machine 1501 may be configured to provide identification information, such as a serial number identification and/or IP address of the destination machine 1501 and a request for identification of authorized version(s) of images.

With some form of identification of the destination machine 1501, server 1551 may identify the one or more versions of images that the destination machine 1501 is authorized to maintain. To accomplish this, server 1551 may include or have access to a database to determine, for the particular destination machine 1501 in question, which version(s) of images is the destination machine authorized to maintain. Such a database may be updated as new authorized version(s) of images are identified.

In response to the request for identification of authorized version(s) of images that may be loaded into the logically protected region 1505 of the destination machine 1501, server 1551 may be configured to send identification of the authorized version(s) to the destination machine 1501. Such an identification of authorized version(s) may be an indication that destination machine may load versions 2.0, 3.0, 4.0. With the identified authorized version(s), destination machine 1501 may search the content of the portable memory source 1509 for one or more of the authorized version(s) of images.

If the portable memory source 1509 includes one or more of the authorized versions of images, one or more of the authorized versions if images may be copied from the portable memory source to the logically protected region 1505 of the hard drive of the destination machine 1501. If the destination machine 1501 determines that no authorized version of an image exists on the portable memory source 1509, the technician may be prompted that load of a new image is not authorized and/or that the technician should seek a new portable memory source or new images for the portable memory source. Such a prompting may occur via a display 1503 at the destination machine 1501. Thus, any unauthorized image version is prevented from being loaded by the destination machine from the portable memory source.

Figure 16:
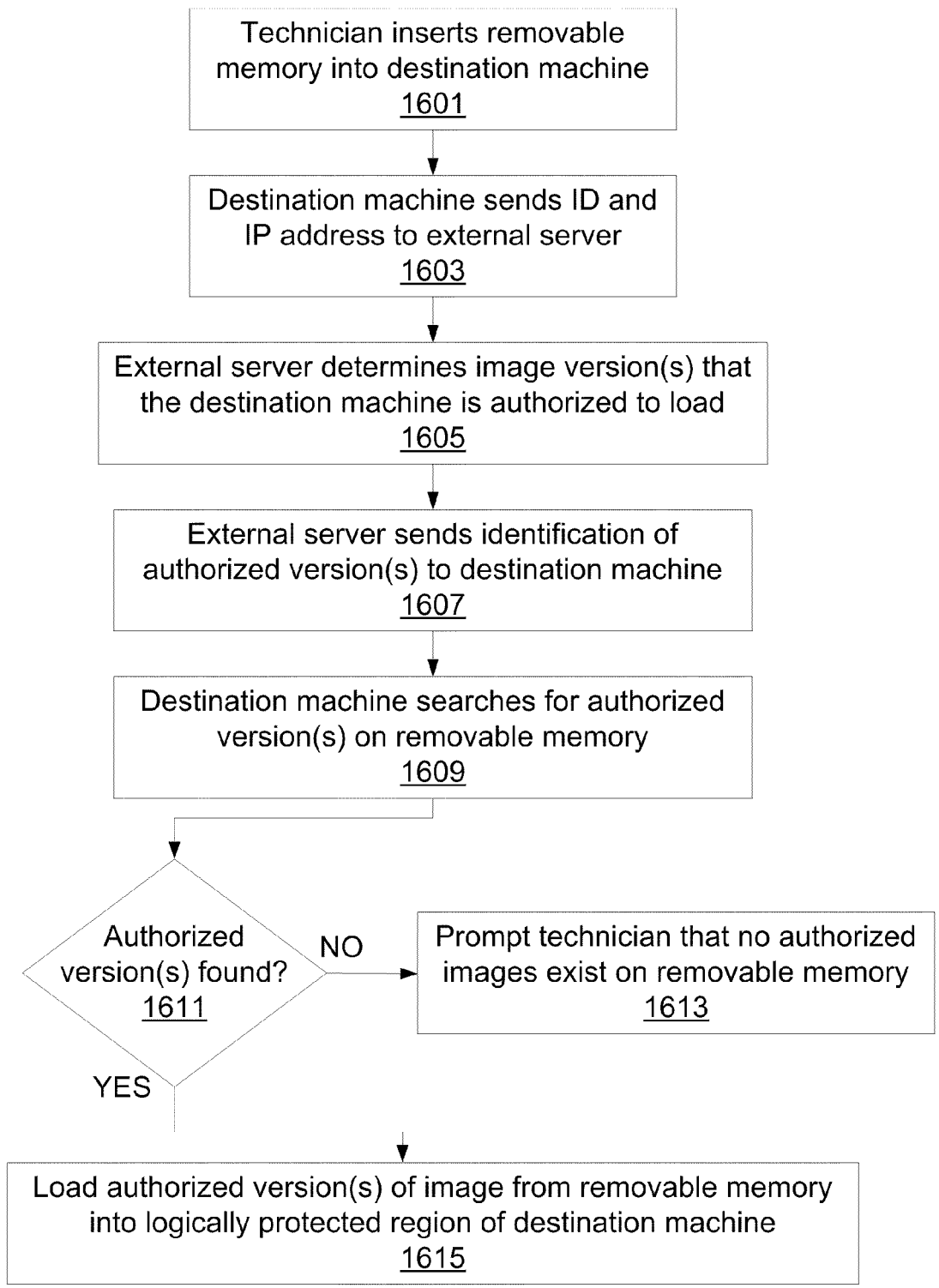
FIG. 16 is an example flowchart of a method for authorizing loading of a new version of a software stack image onto a destination machine.

FIG. 16 is an example flowchart of a method for authorizing loading of a new version of a software stack image onto a destination machine. The process starts and at 1601, a technician present at the destination machine inserts a removable memory source into the destination machine via a connection port. The removable memory may be memory 1509, the destination machine may be destination machine 1501, and the connection port may be connection port 1507 from FIG. 15. At 1603, whether entered by the technician or determined by the destination machine, the destination machine may send identification of the destination machine to an external server. Such identification may include a serial number and/or an IP address associated with the destination machine.

At 1605, the external server may determine the one or more version(s) of images that the destination machine is authorized to load onto its logically protected region. Such a server may be server 1551 and logically protected region may be logically protected region 1505 in FIG. 15. Proceeding to 1607, the external server may send identification of the authorized version(s) of images to the destination machine. In 1609, the destination machine may search for the one or more authorized version(s) of images on the removable memory source inserted by the technician in 1601.

A determination then may be made at 1611 as to whether one or more of the authorized version(s) of images are present on the removable memory source. If no authorized version is found, at 1613, the technician may be prompted that no authorized versions of images exist on the inserted removable memory source. If no authorized version of an image is found on the removable memory source, no image on the removable memory source can be loaded onto the logically protected region of the destination machine. Returning to 1611, if one or more authorized versions of images is found on the removable memory source, at 1615, the one or more authorized versions of images may be copied form the removable memory source to the logically protected region of the destination machine for eventual loading of a software stack on the destination machine.

Figure 17:
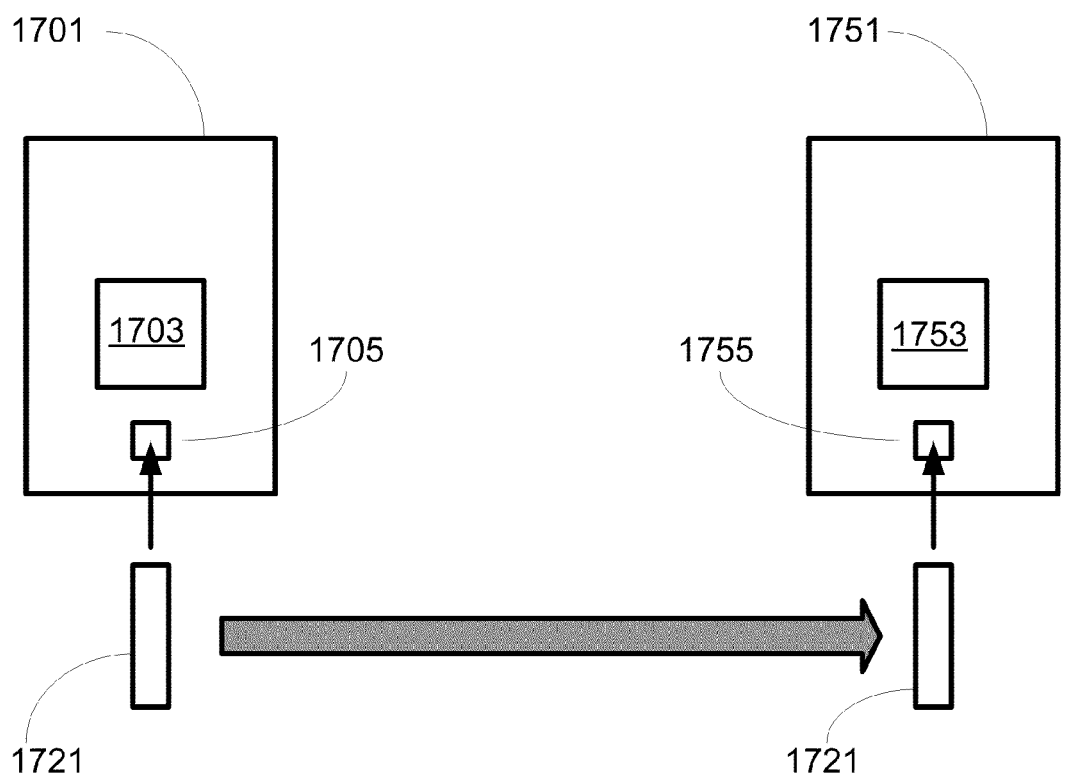
FIG. 17 illustrates an example system for loading an image from a removable memory source onto a destination machine.

FIG. 17 illustrates an example system for loading an image from a removable memory source onto a destination machine in accordance with one or more aspects of the present disclosure. The process shown in FIG. 17 may be a continuation from 1613 in FIG. 16 where a technician has been prompted that her attempt to load an image from a removable memory source is not authorized. In FIG. 17, the technician may have received a prompt from destination machine 1751 that no authorized version of an image exists on removable memory source 1721. In response, the technician may access a different destination machine 1701 on the same or a different network that already maintains one or more of the authorized versions of images that the destination machine 1751 may load.

At different destination machine 1701, the technician may insert the removable memory source 1721 into the destination machine 1701 via a connection port 1705. Having connected, the technician may copy one or more authorized versions of images from the logically protected region 1703 of the destination machine 1701 to the portable memory source 1721. As such, the technician has been able to acquire one or more new versions of images onto her portable memory source 1721 from the different destination machine 1701. With the one or more authorized versions of images on the portable memory stick 1721, the technician may return to the first destination machine 1751, insert the portable memory source 1721 into the destination machine 1751 via connection port 1755, and load the one or more authorized versions of images from the portable memory source 1721 to the logically protected region 1753 of the destination machine 1751.

Figure 18:
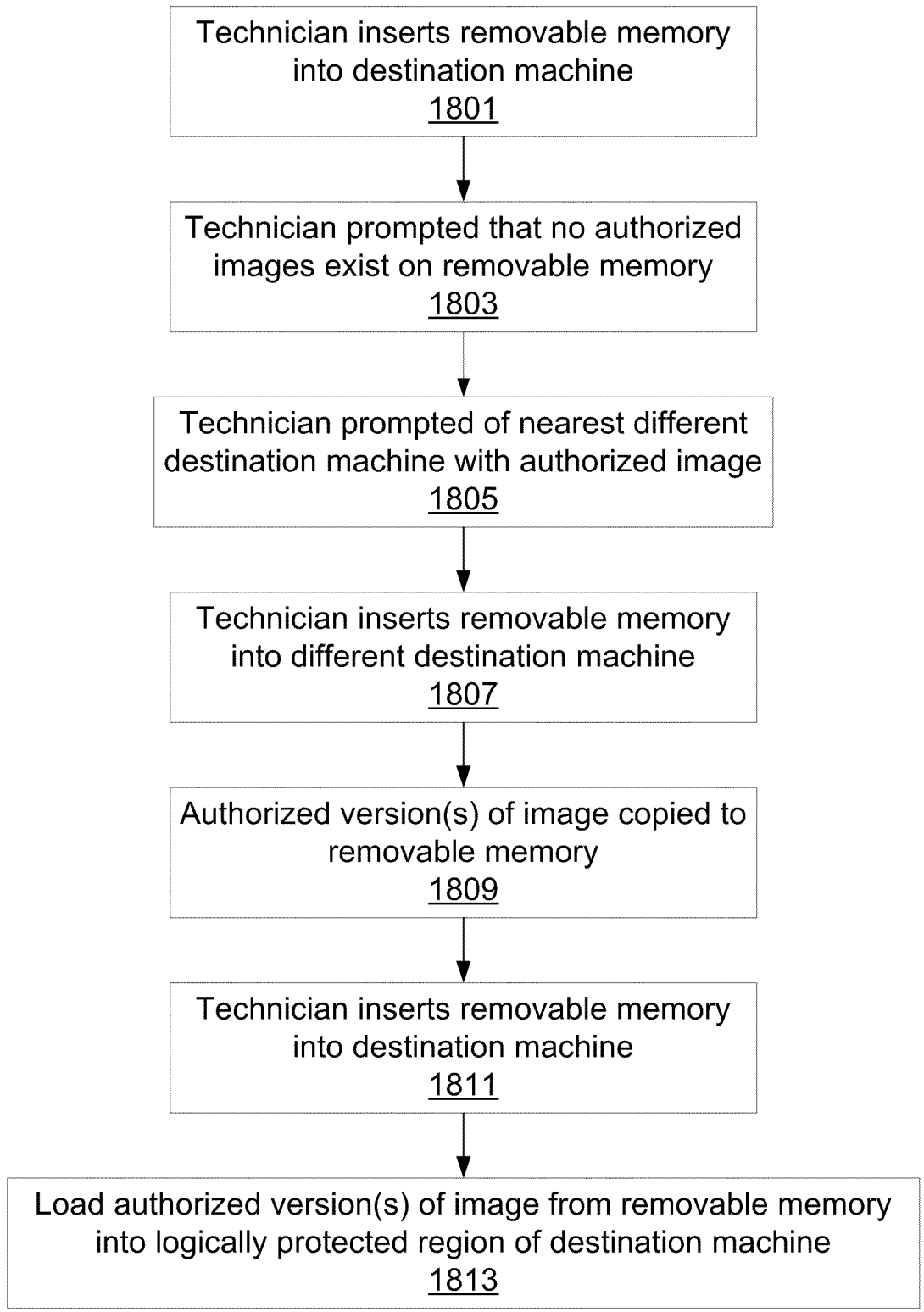
FIG. 18 is an example flowchart of a method for loading an image from a removable memory source onto a destination machine.

FIG. 18 is an example flowchart of a method for loading an image from a removable memory source onto a destination machine. The process starts and at 1801, a technician present at the destination machine inserts a removable memory source into the destination machine via a connection port. At 1803, the technician may be prompted that no authorized versions of images exist on the removable memory source. At 1805, the technician may be prompted of the physically nearest different destination machine with at least one authorized version of an image. This determination may be based on, for example, the information stored in the database accessible by the server 1551, which may indicate the version of the stack in each SSFTD in the network. The process may then proceed to 1807.

As indicated, at 1807, the technician may insert her removable memory source into a connection port on the different destination machine. Proceeding to 1809, the different destination machine may copy, onto the portable memory source, one or more versions of images that the first destination machine is authorized to maintain in its logically protected region. With the portable memory source now storing one or more authorized versions of images, the technician may return to the first destination machine that prompted her of no authorized versions in 1803.

As in 1801, at 1811, the technician present at the destination machine inserts her removable memory source into the destination machine via the connection port. With the one or more authorized versions of images present on the portable memory source, at 1813, the destination machine may load the one or more authorized versions of images from the portable memory source to the logically protected region of the hard drive of the destination machine.

Figure 19:
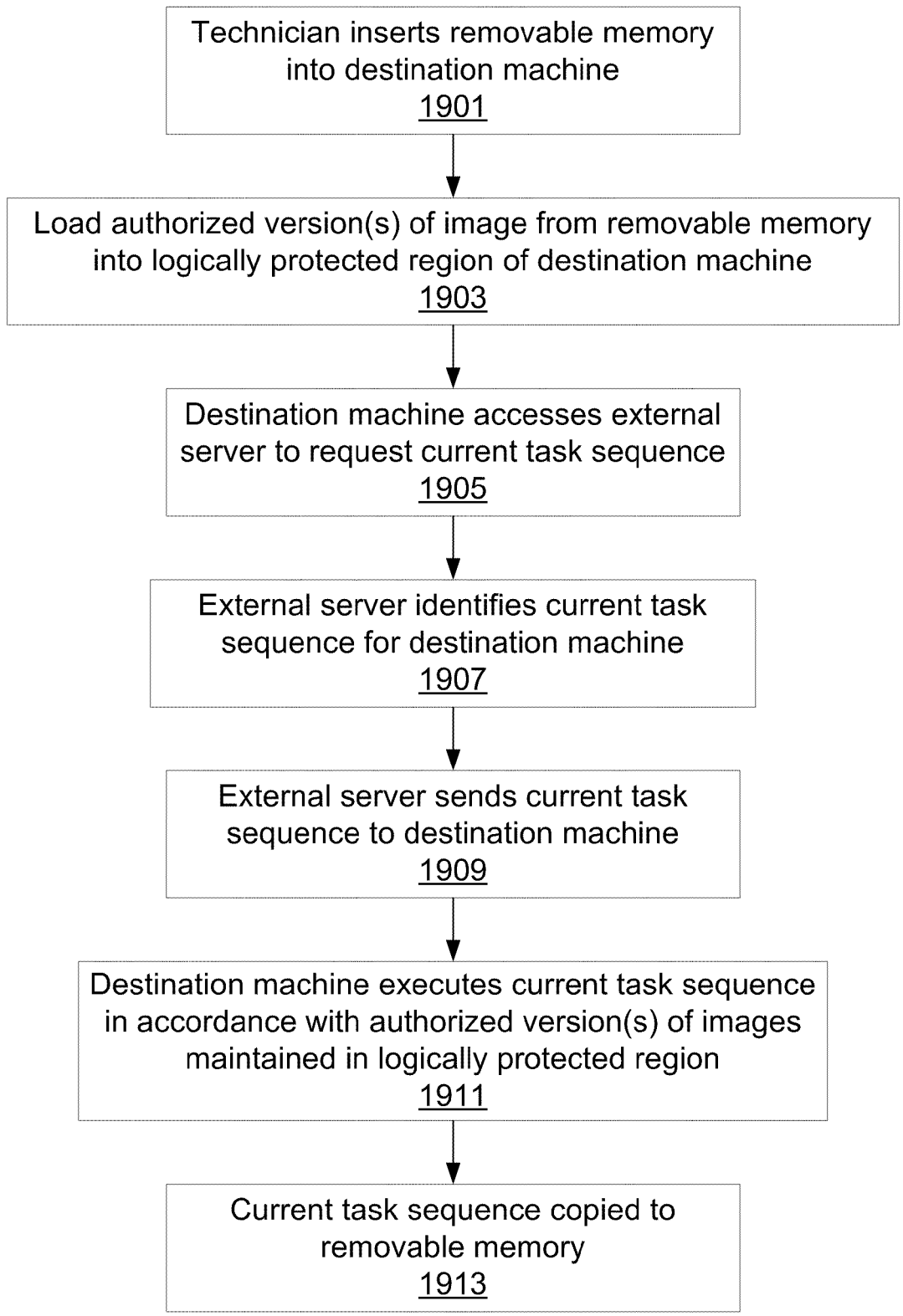
FIG. 19 is an example flowchart of a method for accessing a current task sequence for a destination machine to execute.

FIG. 19 is an example flowchart of a method for accessing a current task sequence for a destination machine to execute in accordance with one or more aspects of the present disclosure. The process starts and at 1901, a technician present at the destination machine inserts a removable memory source into the destination machine via a connection port. At 1903, the destination machine may load one or more authorized versions of images from the portable memory source to a logically protected region of a hard drive of the destination machine.

In determining how to execute creation of a software stack from the loaded images, in 1905, the destination machine may be configured to access an external server to request a current task sequence for execution at the destination machine. For example, the loaded image at the destination machine may include a task sequence that is currently out of date or no longer used. As such, although the image of the software components for the software stack in the loaded image is good to use, the associated task sequence may not be. In accessing an external server to request a current task sequence for execution at the destination machine, such a request may include an identification of the destination machine, such as a model number or serial number. In another example, such a request may include an identification of the task sequence identified in one or more of the loaded images. As such, such a request may be with respect to the destination machine itself and/or may be to the loaded images. Proceeding to 1907, the external server may be configured to identify the current task sequence for implementation by the destination machine. In response, at 1909, the external server may send data representative of the current task sequence to the destination machine. In one example, the data representative of the current task sequence is the current task sequence for execution by the destination machine. In another example, the data representative of the current task sequence may be a version number or some other identifier of the current task sequence.

Moving to 1911, the destination machine may execute the current task sequence received for the external server in accordance with the one or more authorized versions of images maintained in the logically protected region of the destination machine. In addition, at 1913, the current task sequence received form the external server may be copied to the removable memory source of the technician. As such, the technician may now maintain a current authorized version of an image and a current task sequence for implementing installation of the software stack on the image.

In another example embodiment, a technician may update task sequence data for a plurality of images, even if not utilized and/or authorized for the destination machine that the technician has connected the removable memory source to. For example, after connecting a removable memory source, the destination machine may identify at least one unauthorized version of the image of the software stack that is on the removable memory source. While accessing an external server to request a current task sequence for execution at the destination machine, another request may be made for a current task sequence for execution of the at least one unauthorized version of the image of the software stack. Then, the destination machine may receive data representative of the current task sequence for execution of at least one unauthorized version of the image of the software stack. Finally, the destination machine may record the data representing the current task sequence for execution of at least one unauthorized version of the image of the software stack to the removable memory source. As such, the destination machine may be utilized for updating task sequences of unauthorized versions of the image for a technician to use on other destination machines without the destination machine having access to the unauthorized version of the image of the software stack.

Prohibiting Remote Viewing of SSFTD Transactions

When an SSFTD is being remotely interacted with by service provider 201, such as by updating the software stack or obtaining bulk transaction information, it may sometimes be possible for service provider 201 to observe details of a transaction that is in progress during the attempted remote interaction. In many cases this may be undesirable. For instance, where the SSFTDs are ATMs, there may be regulations or other policies that prohibit observing details of a deposit or withdrawal transaction in progress by a user of the machine.

As discussed previously, service provider 201 may be an entity that is responsible for the software maintenance of SSFTDs 100A-C. Service provider 201 may be, for example a bank or other financial institution, or it may be purely a software maintenance entity, and may desire to electronically and remotely interact with one or more of the SSFTDs via network 110 or via a direct communication. For example, service provider 201, which may itself include or be a computer such as reference machine 700, may attempt to download data from one or more of the SSFTDs 100 concerning transactions that have already taken place, or may attempt to upgrade the software on one or more of the SSFTDs 100. Regardless of the type of remote interaction, it may further be desirable that any interaction not make it easier for someone located at service provider 201 to have access to information concerning an ongoing local transaction such as a monetary deposit or withdrawal.

Figure 22:
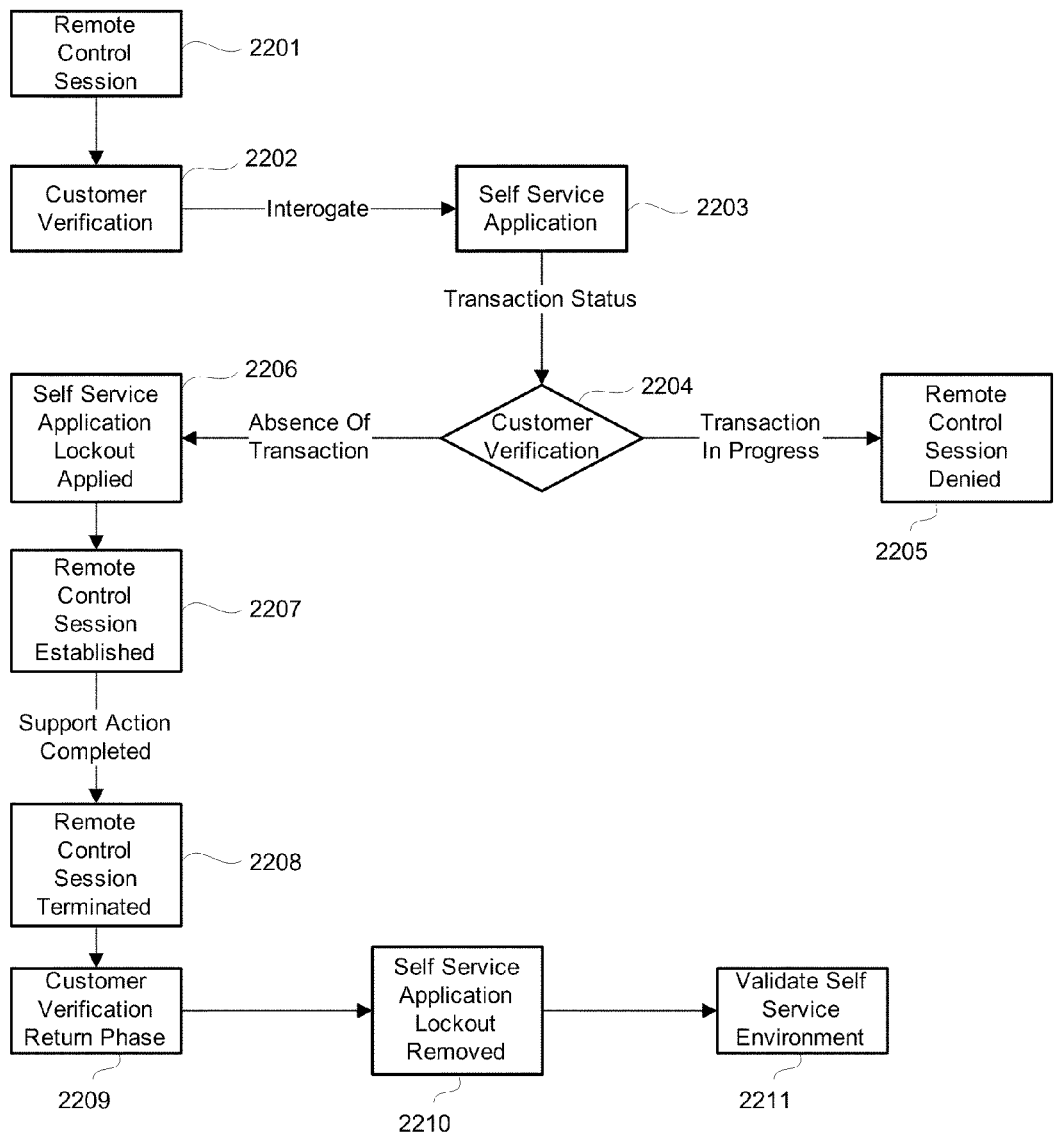
FIG. 22 is a flow chart showing illustrative steps in a process that may be performed to prohibit remote observation of a transaction in progress.

To accomplish this, the system may perform a method such as that shown in FIG. 22, which is a flow chart showing illustrative steps in a process that may be performed to prohibit remote observation of a transaction in progress. In this example method, the remote transaction desired by service provider 201 is blocked if there is an ongoing local transaction, and allowed only after the local transaction is terminated. In the following example, it will be assumed that service provider 201 is interacting with SSFTD 100-A. Also, it will be assumed that all communications between service provider 201 and SSFTD 100-A are transferred via network 110. However, communications between service provider 201 and SSFTD 100-A may be by other means, such as via a direct communication wired line and/or wireless link.

In block 2201, service provider 201 attempts to open a remote control session with SSFTD 100-A. This may involve a handshaking routine between a computer of service provider 201 and SSFTD 100-A. Next, in block 2202, service provider 201 and/or SSFTD 100-A verify whether there is a customer local to SSFTD 100-A (e.g., a person physically using SSFTD 100-A) involved in a local transaction. This may involve, for instance, service provider 201 querying SSFTD 100-A for local transaction status. Alternatively, the query may be implied by the existence of the session opening in block 2201. In either case, in block 2203 SSFTD 100-A may verify the local transaction status, and in block 2204 may return the status as either an absence of a transaction or as a transaction in progress. The determination of the transaction status in blocks 2203 and 2204 may be performed, for example, in accordance with self-service application software executing on computer 101. Using such software, computer 101 may have knowledge of the status based on the state of customer interaction software executing on computer 101.

If the transaction status is that a transaction is in progress, then at block 2205 the remote control session is denied, terminated, or placed in a hold state. If the remote control session is placed in a hold state, then SSFTD 100-A may periodically execute block 2204 until it is determined that the transaction is no longer in progress (i.e., that there is now an absence of transaction). Alternatively, the session attempt may terminate and a new remote control session may need to be requested at block 2201.

As an example of how this might work, assume that a user of SSFTD 100-A is presently depositing money into his or her account. The deposit transaction may be defined as starting and terminating at any points, however in this example it will be assumed that the transaction begins with the first user input to SSFTD 100-A (e.g., inserting an ATM card) and ends with SSFTD 100-A providing its last communication to the user specific to the transaction (e.g., printing out a statement of the transaction using printer 106 or returning the ATM card).

If the transaction status is an absence of transaction, then at block 2206, SSFTD 100-A may lock out any further local transactions in preparation for further remote interaction with service provider 201. This may be performed, for example, by computer 101 of SSFTD 100-A placing the software in a state that temporarily prevents input by a user such as input via key pad 107 and deposit unit 103. In addition, computer 101 may cause a message to be displayed on display 105 indicating that SSFTD 100-A is temporarily unavailable.

Next, at block 2207, computer 101 may establish (e.g., acknowledge and/or complete the handshaking routine) the remote control session with service provider 201, in order to allow service provider 201 to gain remote control functionality of SSFTD 100-A. As discussed previously, such remote control functionality may include, for example, extracting transaction or other data from SSFTD 100-A, or modifying the software operating on SSFTD 100-A. Again during these remote control activities, no further local transactions may be conducted due to the lockout still in effect when applied at block 2206).

Once the desired remote control activities are completed, such as may be indicated by service provider 201 or per a timeout delay, the remote control session is terminated in block 2208. Then, in block 2209, the lockout is removed such that local transactions may once again be performed at SSFTD 100-A.

CONCLUSION

While various illustrative embodiments are specifically shown and described, it will be understood by those skilled in the art that the present disclosure is not limited to these embodiments. Modifications may be made by those skilled in the art, particularly in light of the foregoing teachings. For example, each of the elements of the aforementioned described embodiments may be utilized alone or in combination or subcombination with elements of the other embodiments. It will therefore be appreciated and understood that such modifications may be made without departing from the true spirit and scope of the present disclosure. The description herein is thus to be regarded as illustrative, rather than as restrictive, of the present disclosure.

We claim:

1. A method, comprising:
   receiving, by a computer, data representing a first manifest and a second manifest, the first manifest identifying at least some of a plurality of software components and the second manifest identifying at least some of the plurality of software components;
   determining a first one of the software components that is identified by, but not part of, the second manifest and not identified by the first manifest;
   transferring, by the computer, the first one of the software components to a logically protected region of a computer-readable medium;
   generating, by the computer, an updated separate task sequence comprising a set of instructions for installing the first one of the software components to the a software stack residing on the computer;
   transferring by the computer, the updated to separate task sequence to the logically protected region of the computer-readable medium;
   identifying a version of a software component that resides on both the first and the second manifest;
   comparing the version identified residing on the first manifest and the version identified residing on the second manifest;
   determining based on the comparing that the version identified on the second manifest is a higher version number than a version number of the version identified by the first manifest; and
   generating the separate task sequence so as to comprise a set of instructions for de-installing from the software stack the one of the software components with a lower version number identified as residing on the first manifest and installing to the software stack the software component with the higher version number residing on the second manifest.

2. The method of claim 1, further comprising determining a second one of the software components that is identified by the first manifest and not identified by the second manifest, wherein generating comprises generating the separate task sequence to further comprise a set of instructions for de-installing the second software component from the software stack.

3. The method of claim 1, wherein the first and second manifests each identify a version of a second one of the software components, and wherein the method further comprises:
comparing the version identified by the first manifest and the version identified by the second manifest; and
responsive to determining based on the comparing that the version identified by the second manifest is different from the version identified by the first manifest, generating the separate task sequence so as to comprise a set of instructions for de-installing from the software stack the second one of the software components and installing to the software stack the version of the second one of the software components identified by the second manifest.

4. The method of claim 1, further comprising sending the data representing the separate task sequence over a network.

5. The method of claim 1, wherein the software components are installer components.

6. The method of claim 1, further comprising executing the separate task sequence to modify the software stack.

7. A method, comprising:
receiving, by a computer, data representing a first manifest and a second manifest, the first manifest identifying at least some of a plurality of software components and the second manifest identifying at least some of the plurality of software components, wherein the first and second manifests each identify, but do not contain, a version of a first one of the software components;
comparing the version of the first one of the software components identified by the first manifest and the version of the first one of the software components identified by the second manifest;
responsive to determining based on the comparing that the version of the first one of the software components identified by the second manifest is different from the version of the first one of the software components identified by the first manifest, generating a separate task sequence comprising a set of instructions for first de-installing from a software stack residing on the computer the version of the first one of the software components identified by the first manifest then and installing to the software stack the version of the first one of the software components identified by the second manifest; and
transferring, by the computer, the separate task sequence and the version of the first one of the software components identified by the second manifest to a logically protected region of a computer-readable medium.

8. The method of claim 7, further comprising determining a second one of the software components that is identified by the first manifest and not identified by the second manifest, wherein generating comprises generating the separate task sequence to further comprise a set of instructions for de-installing the second software component from the software stack.

9. The method of claim 7, wherein comparing comprises determining whether the version identified by the second manifest is higher than the version identified by the first manifest, and wherein generating the separate task sequence so as to comprise a set of instructions for de-installing from the software stack the first one of the software components and installing to the software stack the version of the first one of the software components identified by the second manifest, is performed responsive to determining that the version identified by the second manifest is higher than the version identified by the first manifest.

10. A non-transitory computer-readable medium storing computer-executable instructions for a computer to:
receive, by a computer, data representing a first manifest and a second manifest, the first manifest identifying at least some of a plurality of software components and the second manifest identifying at least some of the plurality of software components;
determine a first one of the software components that is identified by, but not part of, the second manifest and not identified by the first manifest;
transferring, by the computer, the first one of the software components to a logically protected region of a computer-readable medium
generate, by the computer, an updated separate task sequence comprising a set of instructions for installing the first one of the software components to a software stack residing on the computer;
transfer, by the computer, the updated separate task sequence to the logically protected region of a computer readable medium
identify a version of a software component that resides on both the first and the second manifest;
compare the version identified residing on the first manifest and the version identified residing on the second manifest;
determine based on the comparing that the version identified on the second manifest is a higher version number than a version number of the version identified by the first manifest; and
generate the separate task sequence so as to comprise a set of instructions for de-installing from the software stack the one of the software components with a lower version number identified as residing on the first manifest and installing to the software stack the software component with the higher version number residing on the second manifest.

11. The non-transitory computer-readable medium of claim 10, further comprises determining a second one of the software components that is identified by the first manifest and not identified by the second manifest, wherein generate comprises generate the separate task sequence to further comprise instructions to de-install the second software component from the software stack.

12. The non-transitory computer-readable medium of claim 10, wherein the first and second manifests each identify a version of a second one of the software components, and further comprises:
compare the version identified by the first manifest and the version identified by the second manifest; and
responsive to determining based on the comparison that the version identified by the second manifest is different from the version identified by the first manifest, generate the separate task sequence so as to comprise a set of instructions to de-install from the software stack the second one of the software components and install to the software stack the version of the second one of the software components identified by the second manifest.

13. The non-transitory computer-readable medium of claim 10 further comprises send the data representing the separate task sequence over a network.

14. The non-transitory computer-readable medium of claim 10, wherein the software components are installer components.

15. The non-transitory computer-readable medium of claim 10 further comprises execute the separate task sequence to modify the software stack.

16. A non-transitory computer-readable medium storing computer-executable instructions for a computer to:
  receive, by a computer, data representing a first manifest and a second manifest, the first manifest identifying at least some of a plurality of software components and the second manifest identifying at least some of the plurality of software components, wherein the first and second manifests each identify, but do not contain, a version of a first one of the software components;
  compare the version of the first one of the software components identified by the first manifest and the version of the first one of the software components identified by the second manifest;
  responsive to determining based on the comparing that the version of the first one of the software components identified by the second manifest is different from the version of the first one of the software components identified by the first manifest, generate a separate task sequence comprising a set of instructions to de-install from a software stack residing on the computer the version of the first one of the software components identified by the first manifest and then install to the software stack the version of the first one of the software components identified by the second manifest; and
  transfer, by the computer, the separate task sequence and the version of the software component identified by the second manifest to a logically protected region of a computer readable medium.

17. The non-transitory computer-readable medium of claim 16 further comprises determining a second one of the software components that is identified by the first manifest and not identified by the second manifest, wherein generate comprises generate the separate task sequence to further comprise a set of instructions to de-install the second software component from the software stack.

18. The non-transitory computer-readable medium of claim 16, wherein compare comprises determine whether the version identified by the second manifest is higher than the version identified by the first manifest, and wherein generate the separate task sequence so as to comprise a set of instructions to de-install from the software stack the first one of the software components and install to the software stack the version of the first one of the software components identified by the second manifest, is performed responsive to determining that the version identified by the second manifest is higher than the version identified by the first manifest.

* * * * *